United States Patent
Hafenrichter et al.

(10) Patent No.: US 12,157,278 B2
(45) Date of Patent: Dec. 3, 2024

(54) SYSTEMS AND METHODS FOR SEALING A BOND CAVITY BETWEEN STRUCTURAL COMPONENTS

(71) Applicant: The Boeing Company, Chicago, IL (US)

(72) Inventors: Joseph L. Hafenrichter, Chicago, IL (US); Gary E. Georgeson, Chicago, IL (US); Marc J. Piehl, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/551,317

(22) Filed: Dec. 15, 2021

(65) Prior Publication Data
US 2022/0194019 A1    Jun. 23, 2022

Related U.S. Application Data

(60) Provisional application No. 63/126,919, filed on Dec. 17, 2020.

(51) Int. Cl.
*B29C 65/48* (2006.01)
*B29C 65/54* (2006.01)
(Continued)

(52) U.S. Cl.
CPC ........ *B29C 65/4835* (2013.01); *B29C 65/542* (2013.01); *B29C 65/562* (2013.01);
(Continued)

(58) Field of Classification Search
CPC . B29C 65/542; B29C 2791/006; B29C 65/10; B29C 65/562; B29C 65/14;
(Continued)

(56) References Cited

U.S. PATENT DOCUMENTS 5,032,210 A * 7/1991 Hukki ................... B07B 1/4618
  156/499
9,873,230 B1 * 1/2018 DesJardien ............. B29C 70/38
(Continued)

FOREIGN PATENT DOCUMENTS

EP           2 100 725 A1    9/2009
WO     WO-0030823 A2 *    6/2000    ........... B29C 70/443

OTHER PUBLICATIONS

"Adding Spacer Beads in Your Adhesive for Precise Bondline Widths? ACW Can Help." Feb. 11, 2020. Addison Clear Wave. Accessed Dec. 28, 2022 at <https://www.addisoncw.com/blog/glass-beads-for-precise-bondline-widths-acw-can-help/> (Year: 2020).*

(Continued)

*Primary Examiner* — Alex B Efta
*Assistant Examiner* — Alexander S Wright
(74) *Attorney, Agent, or Firm* — Yee & Associates, P.C.

(57) ABSTRACT

In an example, a method of sealing a bond cavity is described. The method comprises placing an adhesive around a perimeter of a first structure to be joined to a second structure. The method also comprises positioning the first structure relative to the second structure such that the adhesive is disposed between the first structure and the second structure. The method also comprises merging the first structure and the second structure until the first structure and the second structure are separated by a desired gap for bonding. The method also comprises heating the perimeter to at least partially cure the adhesive to form a leak-proof bond cavity perimeter between the first structure and the second structure.

20 Claims, 16 Drawing Sheets

(51) Int. Cl.
*B29C 65/56* (2006.01)
*B29L 31/30* (2006.01)
*B64C 3/26* (2006.01)

(52) U.S. Cl.
CPC .......... *B64C 3/26* (2013.01); *B29C 2791/006* (2013.01); *B29L 2031/3085* (2013.01)

(58) Field of Classification Search
CPC ..... B29C 65/18; B29C 65/364; B29C 66/863; B29C 65/40; B29C 65/7826; B29C 65/8246; B29C 65/02; B29C 65/7841; B29C 66/112; B29C 66/131; B29C 66/474; B29C 66/242; B29C 66/532; B29C 66/61; B29C 65/4835; B29C 65/483; B29C 66/1122; B29C 66/721; B29L 2031/3085; B29L 2031/3076; B05C 9/10; B05C 5/0216; B05C 9/0216; B64C 3/26; B64C 1/00
See application file for complete search history.

(56) References Cited

U.S. PATENT DOCUMENTS

| | | | |
|---|---|---|---|
| 10,000,019 B2* | 6/2018 | Evens | B29C 73/12 |
| 2004/0035979 A1* | 2/2004 | McCoskey, Jr. | B64C 1/12 |
| | | | 244/117 R |
| 2005/0081784 A1* | 4/2005 | Sakayori | B05C 5/0216 |
| | | | 118/305 |
| 2006/0243382 A1* | 11/2006 | Kilwin | B29C 66/43441 |
| | | | 156/285 |
| 2014/0346179 A1* | 11/2014 | Bailly | B64C 3/20 |
| | | | 264/261 |
| 2017/0001368 A1* | 1/2017 | Czinger | B29C 66/612 |
| 2019/0001581 A1* | 1/2019 | Hafenrichter | H01Q 21/0087 |
| 2019/0003504 A1* | 1/2019 | Bradley | B64C 3/26 |
| 2020/0047921 A1* | 2/2020 | Fernandez | B32B 17/10963 |
| 2021/0316837 A1 | 10/2021 | Hafenrichter et al. | |

OTHER PUBLICATIONS

Extended European Search Report prepared by the European Patent Office in application No. EP 21 21 0871.6 dated May 4, 2022.

* cited by examiner

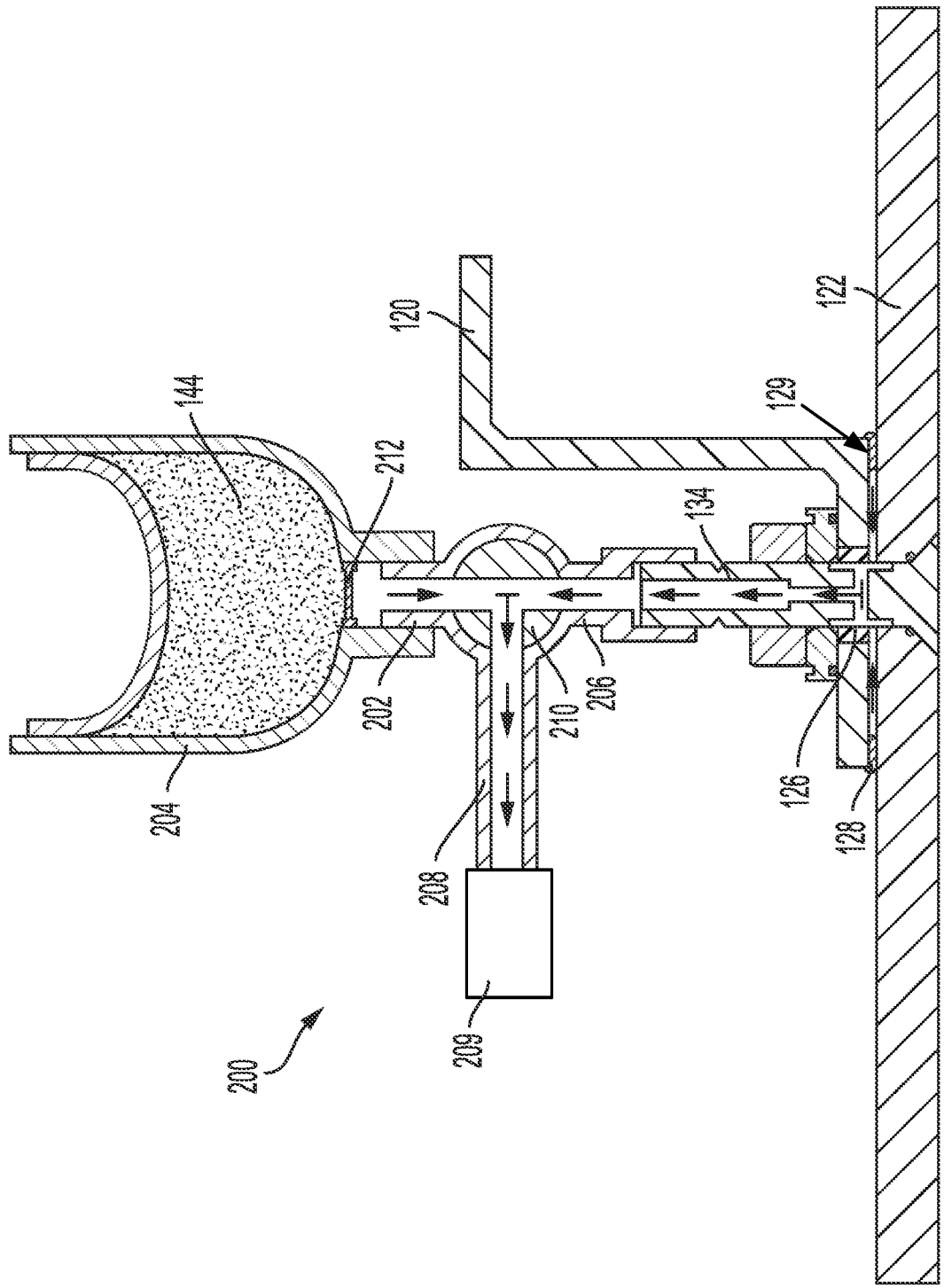

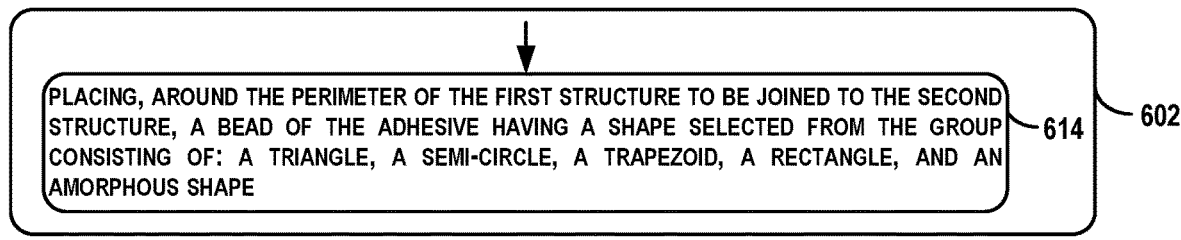
FIG. 10
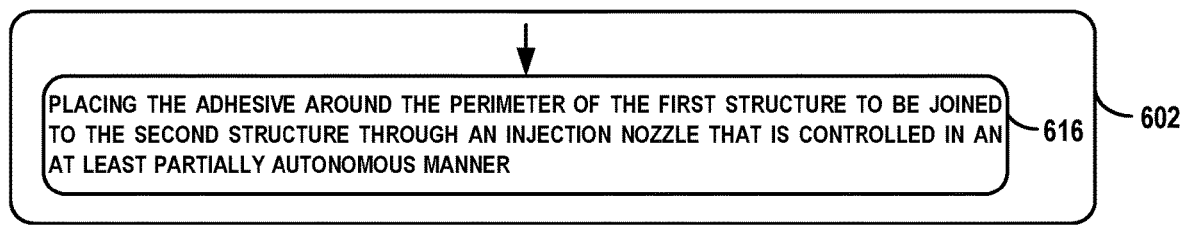
FIG. 11
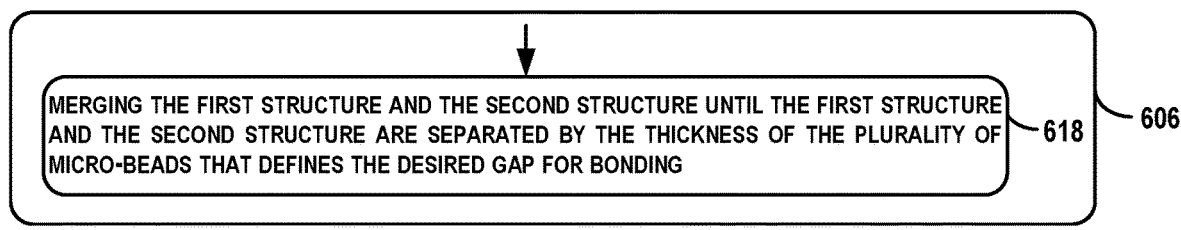
FIG. 12
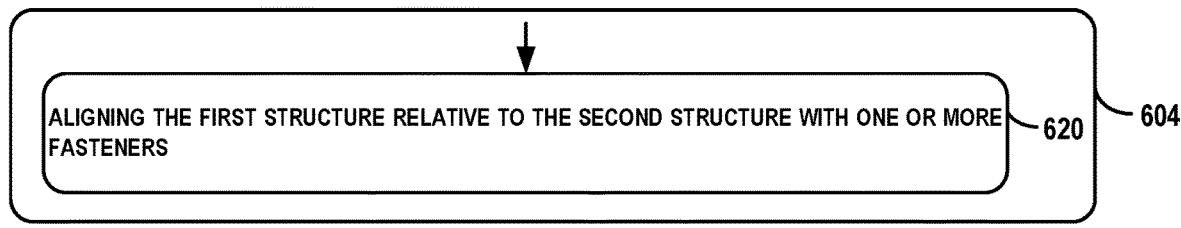
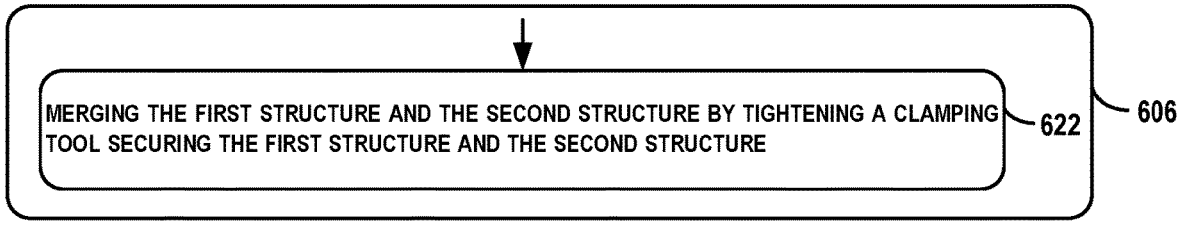
FIG. 13

SYSTEMS AND METHODS FOR SEALING A BOND CAVITY BETWEEN STRUCTURAL COMPONENTS

CROSS-REFERENCE TO RELATED APPLICATIONS

The present disclosure claims priority to U.S. Provisional Application No. 63/126,919, filed on Dec. 17, 2020, the entire contents of which are herein incorporated by reference.

FIELD

The present disclosure relates generally to bonding structural components, and more particularly, to sealing a bond cavity between structural components.

BACKGROUND

In aircraft and other environments, adhesive is often placed between structural components (e.g., composite structures) to bond such structures together. To prepare for bonding, edge masking is performed in order to contain any potential adhesive bleed-out. Existing techniques for edge masking typically involve manually applying adhesive tape, such as a synthetic polymer adhesive tape, on a periphery of structures in preparation for bonding. However, these existing techniques can be time consuming and labor-intensive, typically requiring multiple people to manually place the adhesive tape at desired locations, remove the tape after the adhesive is injected between the structures, and then clean up or otherwise remedy any remaining defects or bleed-out of adhesive. In addition, edge masks created with adhesive tape can produce less than optimal or undesirable bondlines because the seams between strips of the adhesive tape are often susceptible to leaks. Furthermore, edge masks created with adhesive tape can produce inconsistent bondline thickness, which can result in inconsistent bond strength between the structures.

Thus, what is needed is a less time consuming, less labor intensive, and more reliable technique for edge masking that facilitates higher-quality bondlines when bonding structures.

SUMMARY

In an example, a method of sealing a bond cavity is described. The method comprises placing an adhesive around a perimeter of a first structure to be joined to a second structure. The method also comprises positioning the first structure relative to the second structure such that the adhesive is disposed between the first structure and the second structure. The method also comprises merging the first structure and the second structure until the first structure and the second structure are separated by a desired gap for bonding. The method also comprises heating the perimeter to at least partially cure the adhesive to form a leak-proof bond cavity perimeter between the first structure and the second structure.

In another example, a sealed bond cavity between a first structure and a second structure made by a process is described. The process comprises placing an adhesive around a perimeter of the first structure to be joined to the second structure. The process also comprises positioning the first structure relative to the second structure such that the adhesive is disposed between the first structure and the second structure. The process also comprises merging the first structure and the second structure until the first structure and the second structure are separated by a desired gap for bonding. The process also comprises heating the perimeter to at least partially cure the adhesive to form a leak-proof bond cavity perimeter between the first structure and the second structure.

In another example, a system for sealing a bond cavity between a first structure and a second structure is described. The system comprises an injection nozzle. The system also comprises one or more robotic devices. The system also comprises a controller in electronic communication with the injection nozzle and the one or more robotic devices. The controller is configured to control the one or more robotic devices to place, via the injection nozzle, an adhesive around a perimeter of the first structure to be joined to the second structure such that, when the first structure is joined to the second structure and the perimeter is heated to at least partially cure the adhesive and form a leak-proof bond cavity perimeter between the first structure and the second structure.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIGS. 4A-4E illustrate example stages of a process to inject an adhesive in a bond cavity between structural components, according to an example implementation.

FIG. 10 shows a flowchart of an example method for performing the placing function of the method of FIG. 7, according to an example implementation.

FIG. 11 shows a flowchart of an example method for performing the placing function of the method of FIG. 7, according to an example implementation.

FIG. 12 shows a flowchart of an example method for performing the merging function of the method of FIG. 7, according to an example implementation.

FIG. 13 shows a flowchart of an example method for performing the positioning and merging functions of the method of FIG. 7, according to an example implementation.

DETAILED DESCRIPTION

Figure 1:
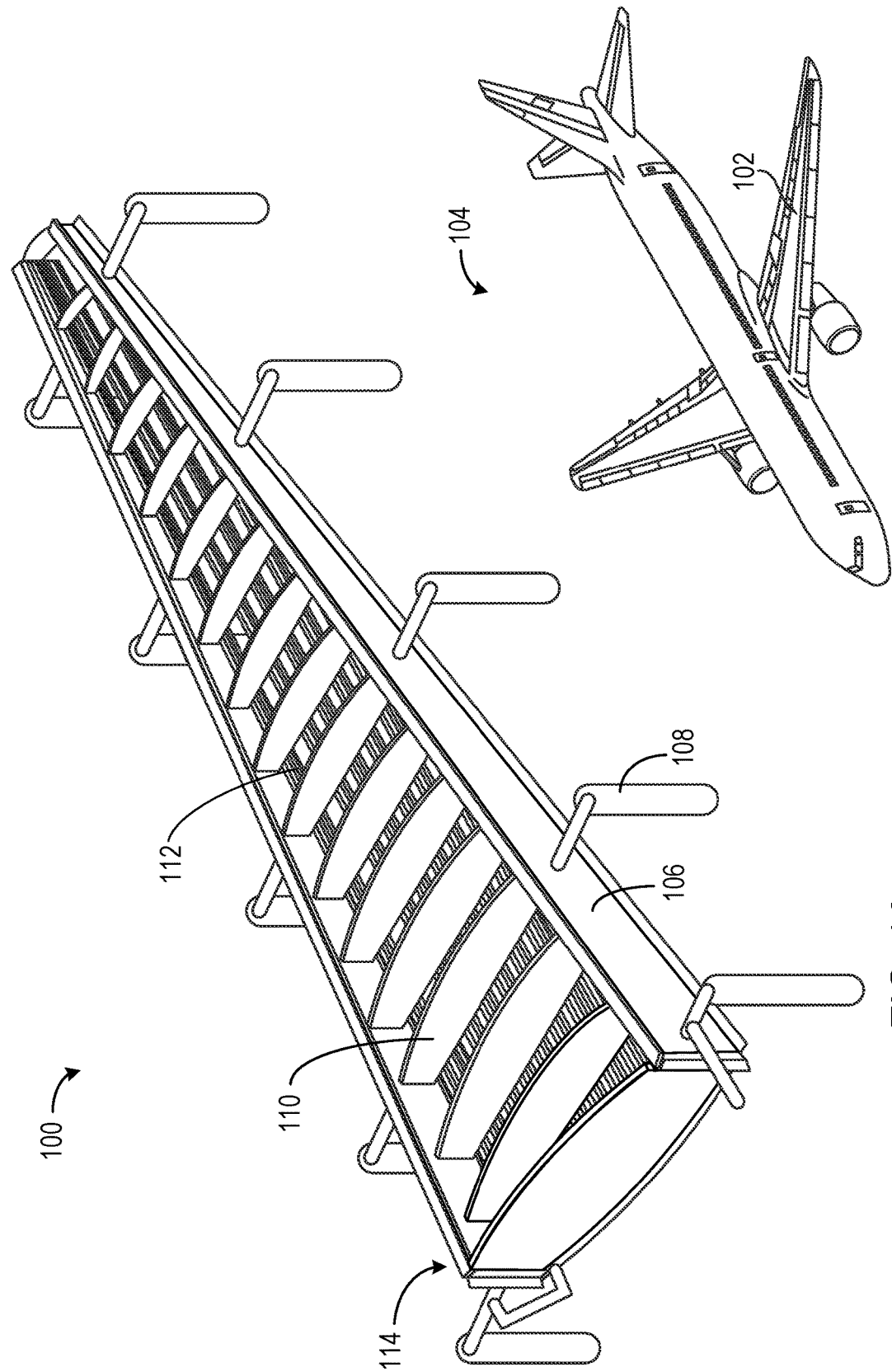
FIG. 1A illustrates a system for forming a bonded wing of an aircraft, according to an example implementation.
FIG. 1B illustrates an example of the aircraft including the bonded wing, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

The disclosed methods and systems will be primarily discussed in the context of bonded structures of an aircraft (e.g., stringers and skins), but the disclosed methods and systems can also implemented with respect to other types of bonded structures as well, in environments other than aircrafts.

Within examples, described herein are methods and systems for sealing a bond cavity between two structures by using a structural adhesive seal. The structural adhesive seal can replace the adhesive tape strips used with existing techniques and provide a reliable, high-quality, leak-proof seal at the perimeter between two structures (e.g., the edges of where the two structures mate).

In particular, to seal a bond cavity using such an adhesive, the adhesive is placed around a perimeter of a first structure that is to be joined to a second structure. For example, the adhesive is placed in the form of a triangular bead or other shape of bead around the perimeter of the first structure that is to be joined to the second structure. The first structure is then positioned (e.g., aligned) relative to the second structure such that the adhesive is disposed between the first structure and the second structure. The first structure is then merged with the second structure—namely, the first structure and the second structure are moved relative to one another (e.g., moved toward each other/pressed together)— until the first structure and the second structure are separated by a desired gap for bonding. In some examples, the adhesive contains micro-beads having a thickness that defines the desired gap for bounding, so that when the first and second structures are joined, the structures are separated by a gap approximately equal to the thickness of the micro-beads, thus providing a consistent bondline thickness between the two structures.

Once the first structure and the second structure are merged, the perimeter is heated to at least partially cure the adhesive, thereby forming a leak-proof bond cavity perimeter between the first structure and the second structure. Furthermore, once the leak-proof bond cavity perimeter is formed, it can be tested for leaks and, if no leaks are present, the bond cavity can be evacuated and adhesive can be injected into the bond cavity for injection bonding of the two structures.

Within examples, one or more of the aforementioned steps are at least partially automated. For instance, a robotic device is controlled to use an injection nozzle or other applicator to place the adhesive around the perimeter of the first structure, and the same robotic device or a different robotic device (e.g., on an assembly line) is controlled to align and/or merge the structures. Whether performed manually or in a partially or fully autonomous manner, the disclosed methods provide, at a minimum, the advantages described herein.

Using the disclosed method described above, the resulting leak-proof bond cavity perimeter is efficiently created in a less labor and time consuming manner, and the likelihood of leaks present in the perimeter is reduced. In addition, the use of micro-beads or similar components disposed in the adhesive can advantageously control the bondline thickness of the resulting leak-proof bond cavity perimeter to have a consistent thickness, thus producing a high-quality bondline that can carry a large structural load.

These and other improvements are described in more detail below. Implementations described below are for purposes of example. The implementations described below, as well as other implementations, may provide other improvements as well.

FIG. 1A illustrates a system 100 for forming a bonded wing 102 of an aircraft 104, according to an example implementation. FIG. 1B illustrates an example of the aircraft 104 including the bonded wing 102.

The system 100 includes a plurality of spars 106, which are held in place by a plurality of fixture arms 108. The plurality of fixture arms 108 are not included in the assembled wing, but are rather provided for purposes of assembly. Other fixtures or tools can be used for holding aspects of the system 100 in place during assembly. The system 100 further includes a plurality of wing ribs 110, which are attached between the spars 106. The system 100 further includes a plurality of longerons 112 (also known as "stringers", in some examples), which run parallel to the spars 106, and which provide an interface between the wing ribs 110 and other aspects of the system 100. The longerons 112 may provide a flexibility and strength to the system 100.

The spars 106 can collectively form a portion of a wing box 114 that provides lateral structure to the system 100, and which provides a general shape and dimension of the system 100. Further, additional components of the system 100 may couple to the wing box 114. Accordingly, the dimensions of the spars 106 may strictly adhere to design plans for the wing 102. For similar reasons, holes in the spars 106 may be close tolerance holes, and therefore can fit the corresponding fasteners in accordance with a given accuracy level (e.g., within 1% of the diameter of the fastener).

Figure 2:
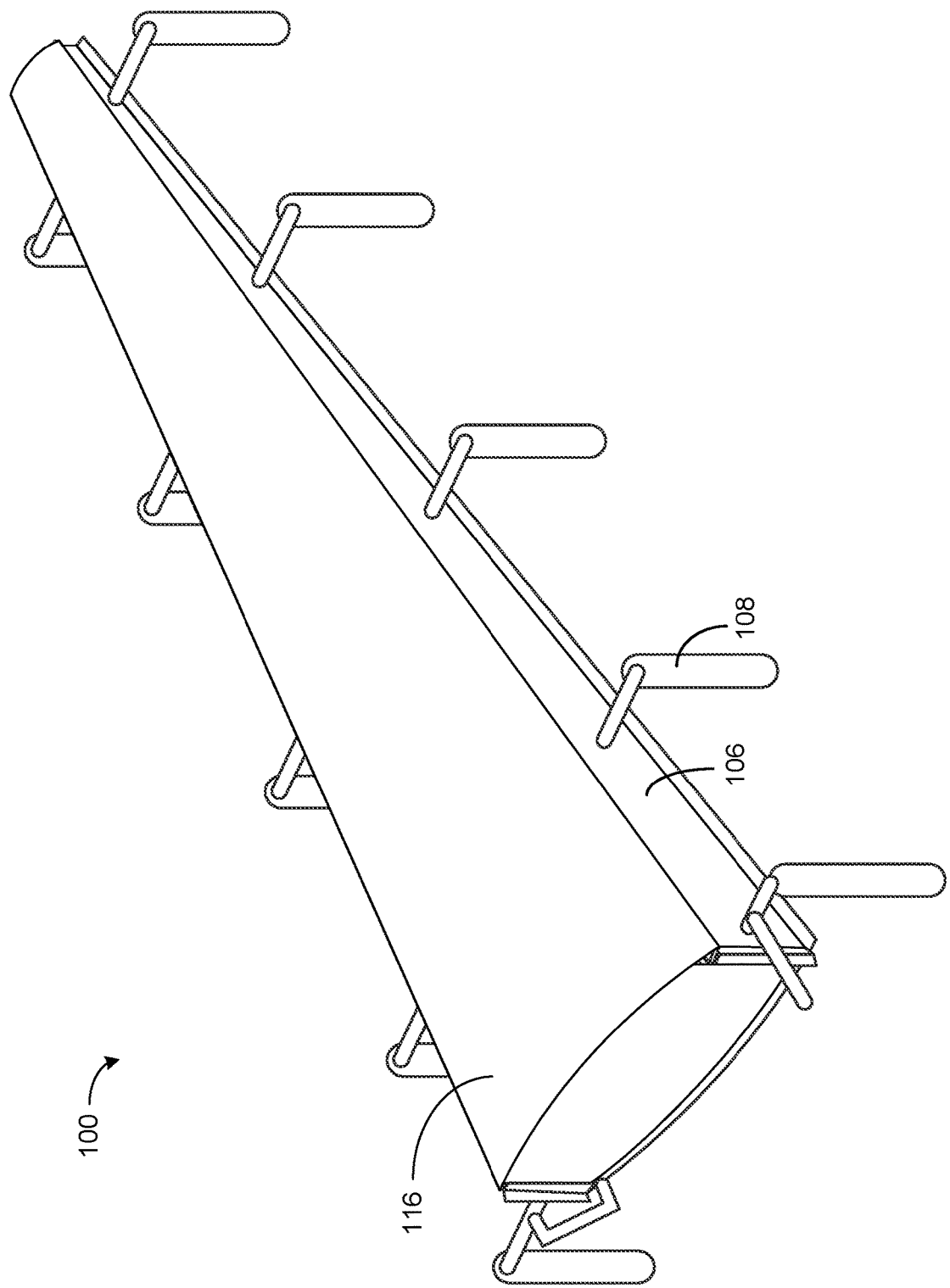
FIG. 2 illustrates the system with a portion of a wing skin coupled or bonded to the spars, the wing ribs, and the longerons, according to an example implementation.

FIG. 2 illustrates the system 100 with a portion of a wing skin 116 coupled or bonded to the spars 106, the wing ribs 110, and the longerons 112, according to an example implementation. By coupling the wing skin 116 to a component of the wing (e.g., the spars 106, the wing ribs 110, and the longerons 112), the bonded wing 102 is formed.

FIGS. 3A-3G illustrate example stages of a process to seal a bond cavity between a first structure 120 and a second structure 122, according to an example implementation. An example first structure can include a component of the wing 102 of the aircraft 104, and an example second structure can include the wing skin 116 of the wing 102 of the aircraft 104. The first structure and the second structure can include other components of the wing 102 or other components of the aircraft 104 as well.

Figure 3A:
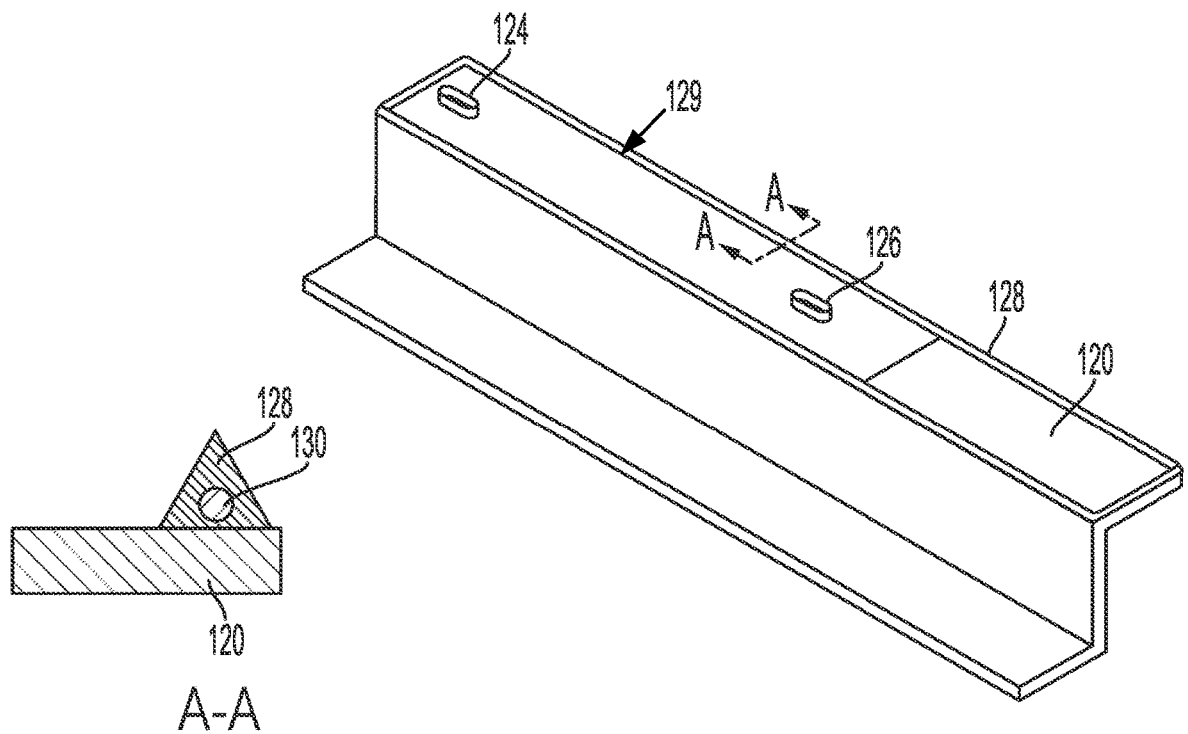
FIGS. 3A-3G illustrate example stages of a process to seal a bond cavity between a first structure and a second structure, according to an example implementation.

In particular, FIG. 3A illustrates a perspective view and a cross-sectional view of a first structure 120 in an initial stage of joining the first structure 120 to the second structure 122 (the second structure 122 is not shown in FIG. 3A). The first structure 120 can be a wing component such as the spars 106, the wing ribs 110, or the longerons 112. Within examples, the first structure 120 can be a stringer of the aircraft 104. The second structure 122 can be the wing skin 116 or another structure of the aircraft 104. The first structure 120 and the second structure 122 can be structures in another type of vehicle or types of structures that are used in contexts other than vehicles. At least one hole, such as a first hole 124 and a second hole 126, can be predrilled or otherwise formed through the first structure 120.

At the initial stage shown in FIG. 3A, an adhesive 128 is placed around a perimeter 129 of the first structure 120. As shown, a substantially triangular bead of the adhesive 128 is placed around the perimeter 129. In other examples, the bead of the adhesive 128 can have other shapes, such as a semi-circle, trapezoid, rectangular, or an amorphous shape. An injection nozzle (not shown in FIG. 3A), such as an edge-following injection nozzle that is controlled manually (e.g., by a human operator) or in an at least partially autonomous manner (e.g., by a robotic device), can be used to place the adhesive 128. Within examples, and as shown in FIG. 3A, the adhesive 128 includes a plurality of micro-beads 130 having a thickness that defines a desired gap for bonding, such as micro-beads that are 0.025 inches in diameter, or another diameter selected from the range of 0.01 to 0.03 inches. Other thicknesses/diameters are possible as well, such as 0.05 inches. Once the adhesive 128 is placed, the first structure 120 can be positioned relative to the second structure 122 such that the adhesive 128 is disposed between the first structure 120 and the second structure 122. In other examples, the adhesive 128 can be placed on the second structure 122 in addition to or instead of being placed on the first structure 120 (e.g., on the second structure 122 in the shape of the perimeter 129 of the first structure 120).

Figure 3B:
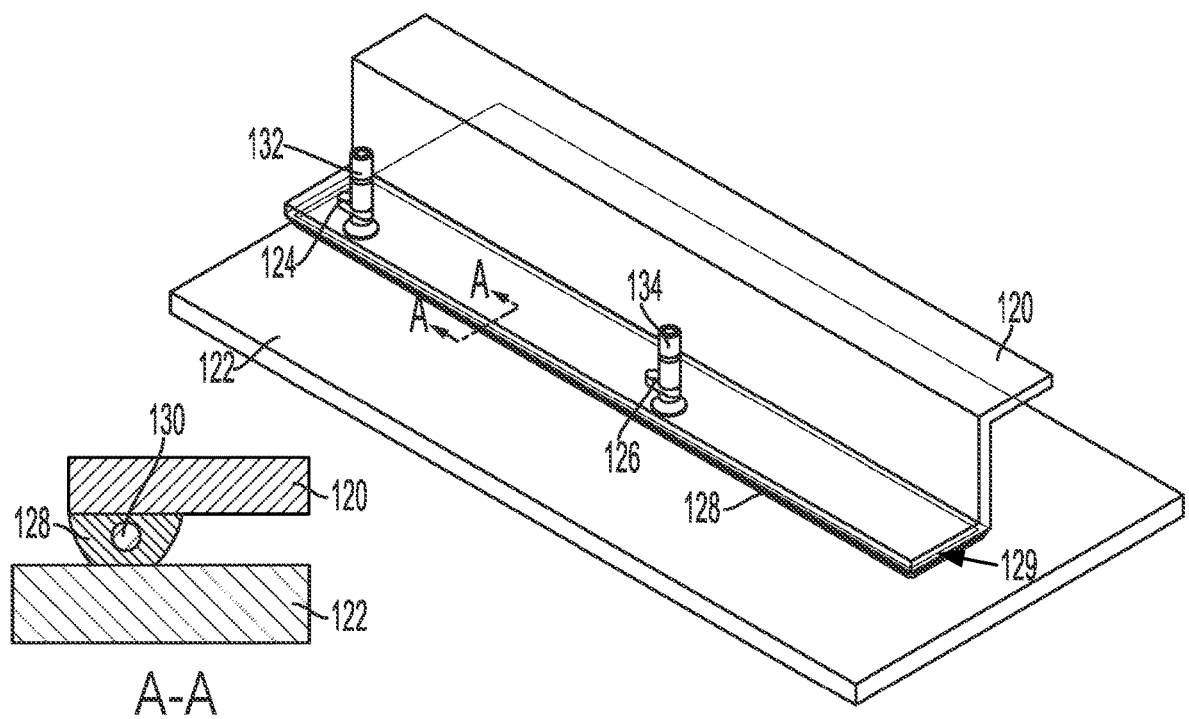

FIG. 3B illustrates a perspective view and a cross-sectional view of a next stage in which the first structure 120 is positioned relative to the second structure 122 such that the adhesive 128 is disposed between the first structure 120 and the second structure 122. As noted above, the first structure 120 and the second structure 122 are separated by the thickness of the plurality of micro-beads 130 that defines the desired gap for bonding. As the first structure 120 and the second structure 122 are merged, the adhesive 128 can be compressed until the first structure 120 and the second structure 122 are separated by the plurality of micro-beads 130. As shown in FIG. 3B, the first structure 120 has been aligned with the second structure 122 with one or more fasteners, such as fastener 132 and fastener 134, either of which can be a bolt or other type of fastener. For the purposes of injecting adhesive into the bond cavity between the structures and/or for other purposes described herein, the one or more fasteners can each include a through-hole that allows access to the bond cavity. To align the two structures, the one or more fasteners can be inserted through holes formed in the first structure 120 (e.g., the first hole 124 and the second hole 126), as well as through corresponding holes formed in the second structure 122 (not shown in FIGS. 3A-3G, but shown in FIGS. 4A-4E).

Figure 3C:
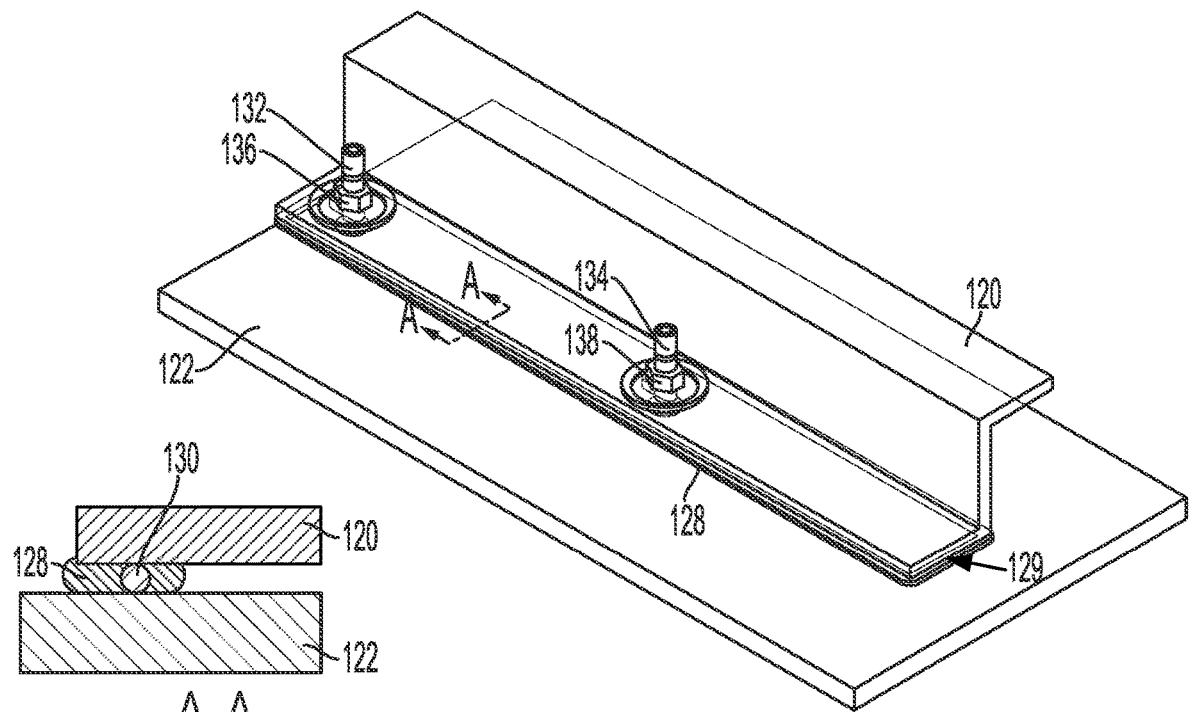

FIG. 3C illustrates a perspective view and a cross-sectional view of a next stage in which the first structure 120 and the second structure 122 are merged (e.g., moved relative to one another) until the first structure 120 and the second structure 122 are separated by the desired gap for bonding. To do so, the first structure 120 can be moved toward the second structure 122, which can be stationary. Alternatively, the second structure 122 can be moved toward the first structure 120, which can be stationary. Still alternatively, both the first structure 120 and the second structure 122 can be moved in a relative manner toward one another. In the example shown in FIG. 3C, one or more gasketed nuts, such as gasketed nut 136 and gasketed nut 138, are tightened to secure fastener 132 and fastener 134, respectively. Additionally or alternatively, a clamping tool can be used to secure the first structure 120 and the second structure 122 and tightened to merge the first structure 120 and the second structure 122 until the desired bond gap is achieved.

Figure 3D:
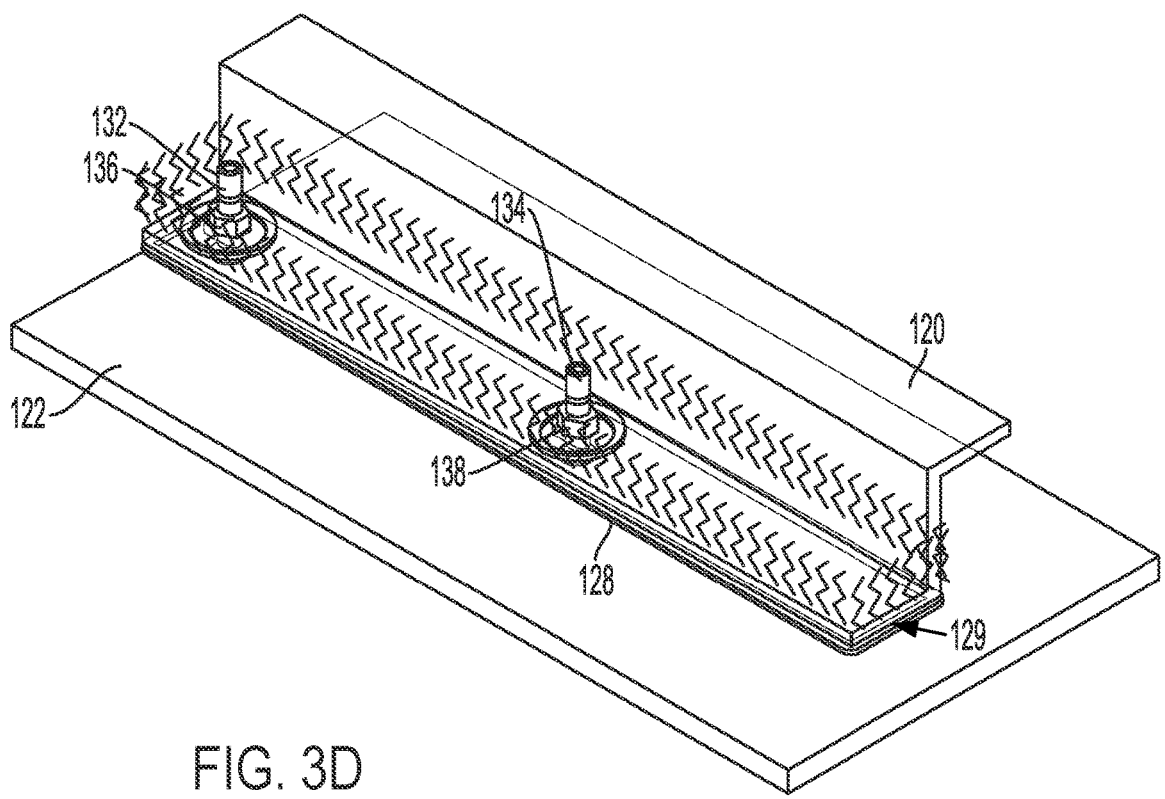

FIG. 3D illustrates a perspective view of a next stage in which the perimeter 129 is heated to at least partially cure the adhesive 128 to form a leak-proof bond cavity perimeter between the first structure 120 and the second structure 122, and thus forming the bond cavity between the first structure 120, the second structure 122, and the leak-proof bond cavity perimeter. In an example, the perimeter 129 is heated at a temperature less than a cure temperature of the adhesive 128 (e.g., less than 350 degrees Fahrenheit) to partially cure the adhesive 128 to form the leak-proof bond cavity perimeter between the first structure 120 and the second structure 122. In another example, the perimeter 129 is heated at a temperature at or above a cure temperature of the adhesive 128 (e.g., at or above 350 degrees Fahrenheit) to fully cure the adhesive 128 to form the leak-proof bond cavity perimeter between the first structure 120 and the second structure 122. Various forms of heating can be used to cure the adhesive 128 including, but not limited to, conductively heating the adhesive 128 with a resistance heat blanket (not shown), radiantly heating the adhesive 128 with a heat lamp (not shown), convectively heating the adhesive 128 with forced air (not shown), and/or inductively heating the adhesive 128 with metallic elements (not shown) embedded in at least the first structure 120.

Figure 3E:
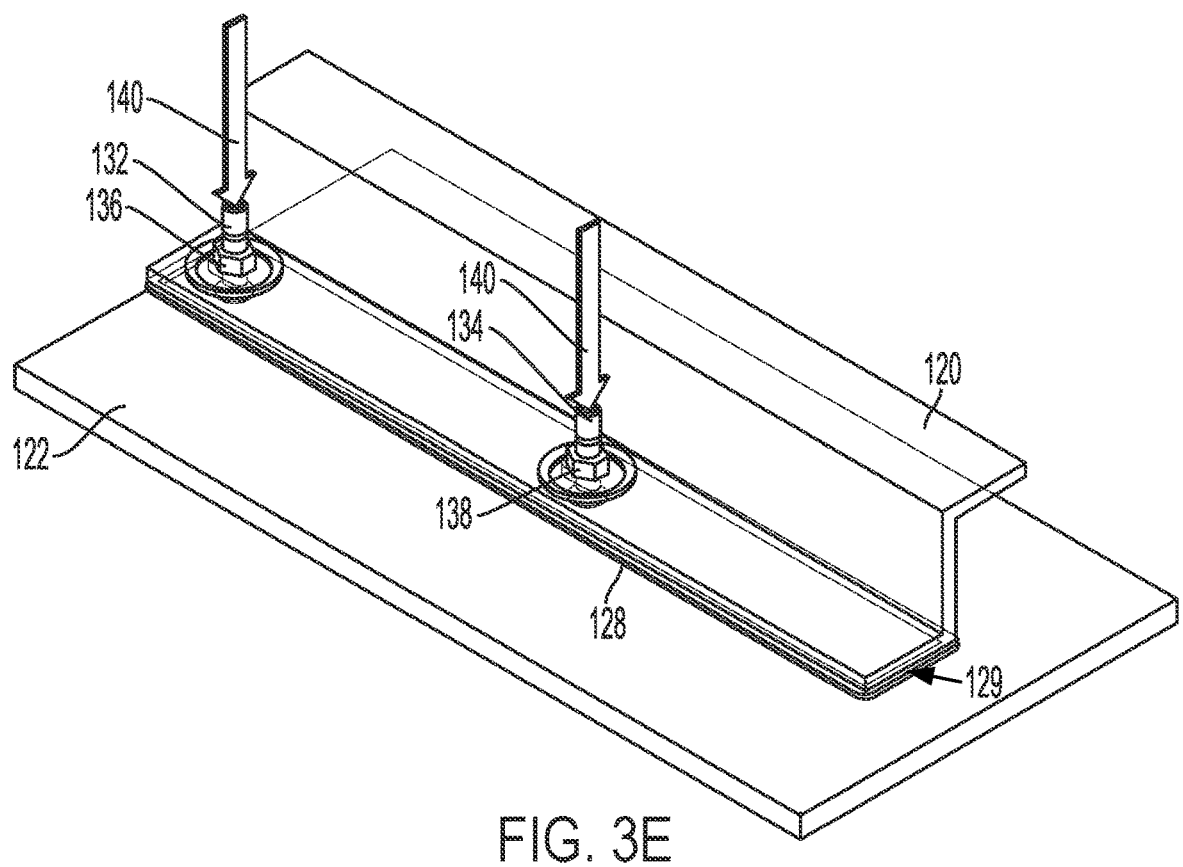

FIG. 3E illustrates a perspective view of a next stage in which gas 140 (e.g., helium) is injected into the bond cavity (via fasteners 132 and 134, as shown, for example) to detect whether there are any leaks along the leak-proof bond cavity perimeter (i.e., leaks in the adhesive 128 that forms the leak-proof bond cavity perimeter). Additionally or alternatively, other techniques for checking leaks along the leak-proof bond cavity perimeter are possible as well. If a leak is found, it may be touched up with a dab of sealant. In some examples, leak checking is optional.

Figure 3F:
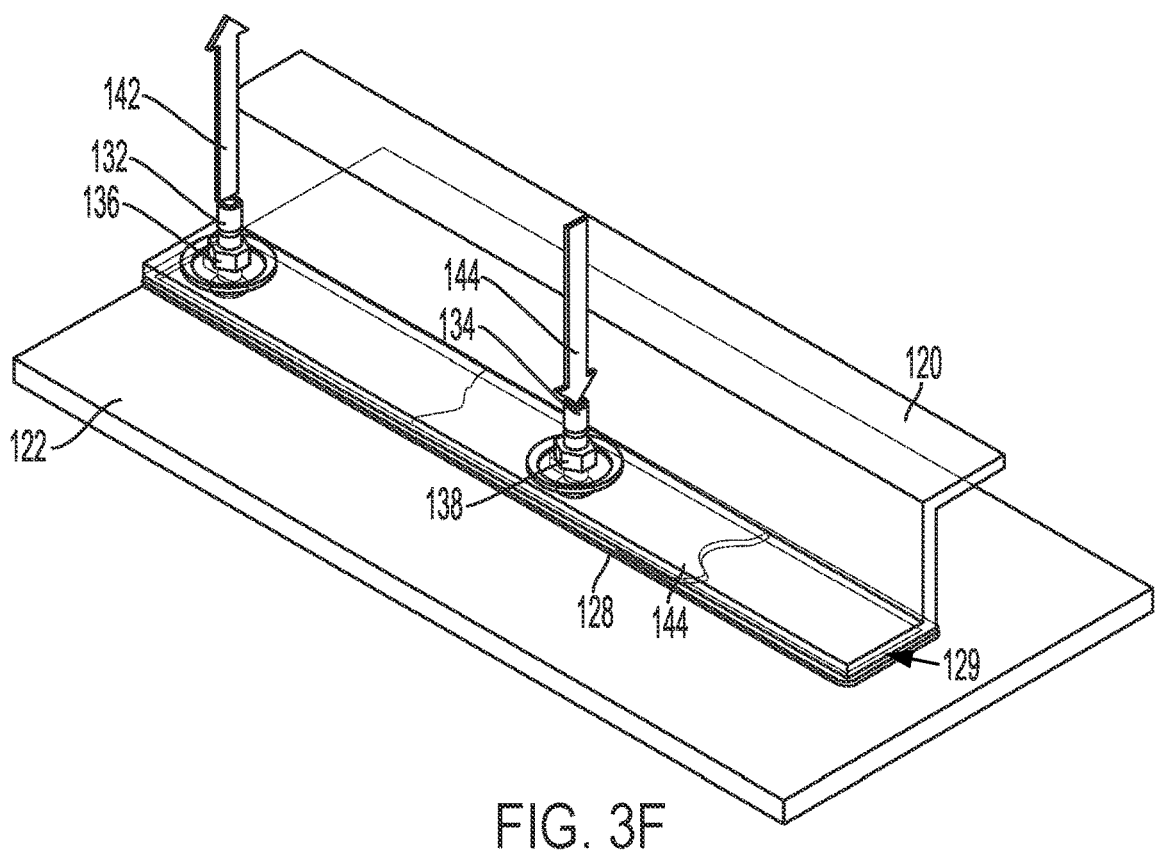

FIG. 3F illustrates a perspective view of a next stage in which air 142 is evacuated from the bond cavity and adhesive 144 is forced into the bond cavity. In FIG. 3F, part of the first structure 120 is transparent so that the adhesive 144 can be seen in the bond cavity. The adhesive 144 is represented by the arrow pointing into fastener 134 and is also shown filling the bond cavity. The adhesive 144 can be the same type of adhesive as the adhesive 128 that forms the leak-proof bond cavity perimeter, or can be a different type of adhesive. In some examples, the adhesive 144 is a de-aerated adhesive (e.g., adhesive paste with bubbles evacuated or air evacuated).

As shown, the bond cavity is evacuated through the first hole 124 (not explicitly shown in FIG. 3F, as it is underneath gasketed nut 136) formed in the first structure 120 and through a through-hole formed in fastener 132, and the adhesive 144 is forced into the bond cavity through the second hole 126 (not explicitly shown in FIG. 3F, as it is underneath gasketed nut 138) formed in the first structure 120 and through a through-hole formed in fastener 134. In some examples, the bond cavity is evacuated while the adhesive 144 is forced into the bond cavity. Alternatively, the bond cavity is evacuated before the adhesive 144 is forced into the bond cavity.

In an alternative evacuation/injection process, the bond cavity can be evacuated and the adhesive 144 can be forced into the bond cavity through the same hole. To facilitate this, a single hole (e.g., the first hole 124 or the second hole 126) is predrilled or otherwise formed in the first structure 120 to access the bond cavity. The bond cavity is then evacuated through the single hole. After evacuation, the adhesive 144 is forced into the bond cavity through the single hole. This single-hole process is illustrated and described in more detail with respect to FIGS. 4A-4E. By evacuating the bond cavity in the two-hole or single hole manners described above, little or no air can be present in the bond cavity, thus reducing or eliminating the chance of a bondline void forming after the adhesive 144 is injected. Further, the adhesive 128 that forms the leak-proof bond cavity perimeter can contain all of the adhesive 144 that is injected so as to prevent adhesive 144 from leaking and exiting the bond cavity. In some examples, the evacuation/injection process described above (and subsequent curing of the adhesive 144) is optional. Furthermore, it should be understood that, additionally or alternatively to injecting the adhesive 144 through a hole in the first structure 120, the adhesive 144 could be injected through the adhesive 128 that forms the leak-proof bond cavity perimeter. For example, a hypodermic needle or other type of needle could be used to puncture a small hole in the adhesive 128 that forms the leak-proof bond cavity perimeter, after which the hypodermic needle could be used to force the adhesive 144 into the bond cavity. The hole left by the needle can then be touched up and filled with more adhesive or a sealant.

Figure 3G:
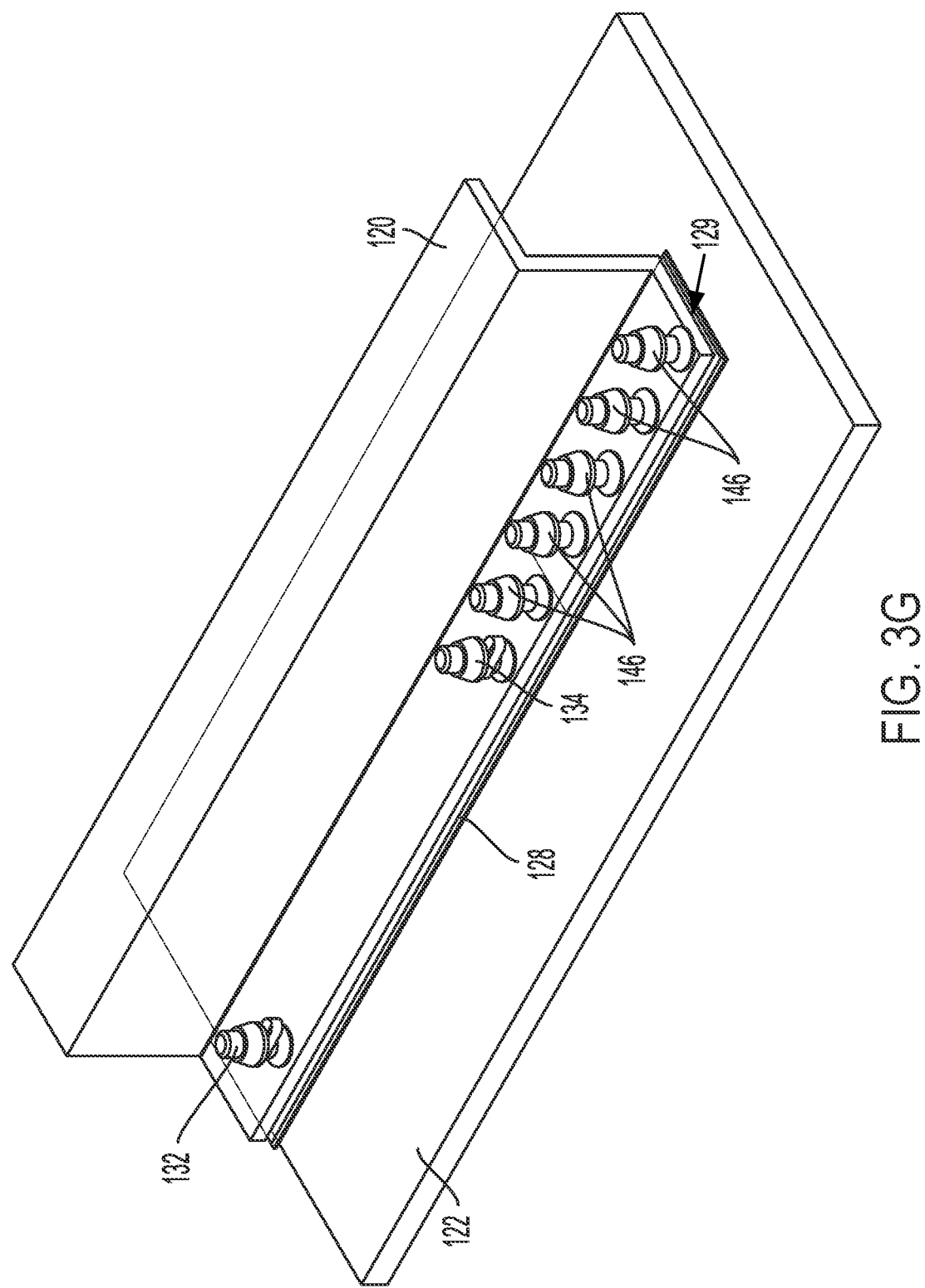

FIG. 3G illustrates a perspective view of a next stage in which the adhesive 144 that was forced into the bond cavity is cured and the first structure 120 is fastened to the second structure 122 after curing the adhesive 144. In particular, one or more of the heating techniques described above can be used to cure the adhesive 144. Alternatively, the adhesive 144 may be an adhesive that cures at room temperature, and thus another technique for heating/curing might not be needed. Once the adhesive 144 is cured, additional holes can be drilled into the first structure 120 and the second structure 122 and through the cured adhesive 144, and additional fasteners 146 can be used to fasten the first structure 120 and the second structure 122 together, which can increase the strength of the bond between the two structures. In some examples, the curing and/or additional fastening can be optional.

FIGS. 4A-4E illustrate example stages of a process to inject the adhesive 144 in the bond cavity formed between the first structure 120, the second structure 122, and the leak-proof bond cavity perimeter formed by adhesive 128. In particular, FIGS. 4A-4E show an example of an adhesive injection apparatus 200 that can be used for this purpose.

The adhesive injection apparatus 200 includes a transfer channel 202 configured to be fluidly coupled to an adhesive reservoir 204. In an example, the adhesive injection apparatus 200 includes the adhesive reservoir 204. In another example, the adhesive injection apparatus 200 is attached to the adhesive reservoir. The adhesive injection apparatus 200 also includes an injection channel 206 configured to be fluidly coupled to the bond cavity. The adhesive injection apparatus 200 also includes an evacuation channel 208 configured to be fluidly coupled to a vacuum source 209. Further, the adhesive injection apparatus 200 includes a three-way valve 210 disposed between the transfer channel 202, the injection channel 206, and the evacuation channel 208. The three-way valve 210 is selectively operable to establish fluid communication between the evacuation channel 208 and the injection channel 206, between the evacuation channel 208 and the transfer channel 202, and between the transfer channel 202 and the injection channel 206. Still further, the adhesive injection apparatus 200 includes a frangible seal 212 proximal to and separating the adhesive reservoir 204 from the transfer channel 202. The frangible seal 212 prevents air from entering the adhesive reservoir 204.

To facilitate the injection channel 206 being fluidly coupled to the bond cavity, the injection channel 206 is coupled to (e.g., placed over, attached to, etc.) fastener 134, which has a through-hole formed therewithin and has been fed through one of the holes formed in the first structure 120 (e.g., the second hole 126, shown in FIGS. 4A-4E).

FIG. 4A illustrates a cross-sectional view of an initial stage in which the adhesive injection apparatus 200 is used to evacuate the bond cavity. To facilitate this, the three-way valve 210 can be positioned as shown in FIG. 4A to establish fluid communication between the evacuation channel 208, the injection channel 206, and the transfer channel 202, thus allowing for the vacuum source 209 to be turned on and used to evacuate the injection channel 206, the transfer channel 202, and the bond cavity at substantially the same time. Arrows are shown to illustrate air drawn out of the injection channel 206, the transfer channel 202, and the bond cavity.

Alternatively, the three-way valve 210 can be positioned to establish fluid communication between the evacuation channel 208 and the injection channel 206. The vacuum source 209 is then turned on to evacuate the injection channel 206 and the bond cavity. After evacuating the bond cavity and the injection channel 206, the three-way valve 210 can then be positioned to establish fluid communication between the evacuation channel 208 and the transfer channel 202 and the vacuum source 209 can be turned on to evacuate the transfer channel 202.

Figure 4C:
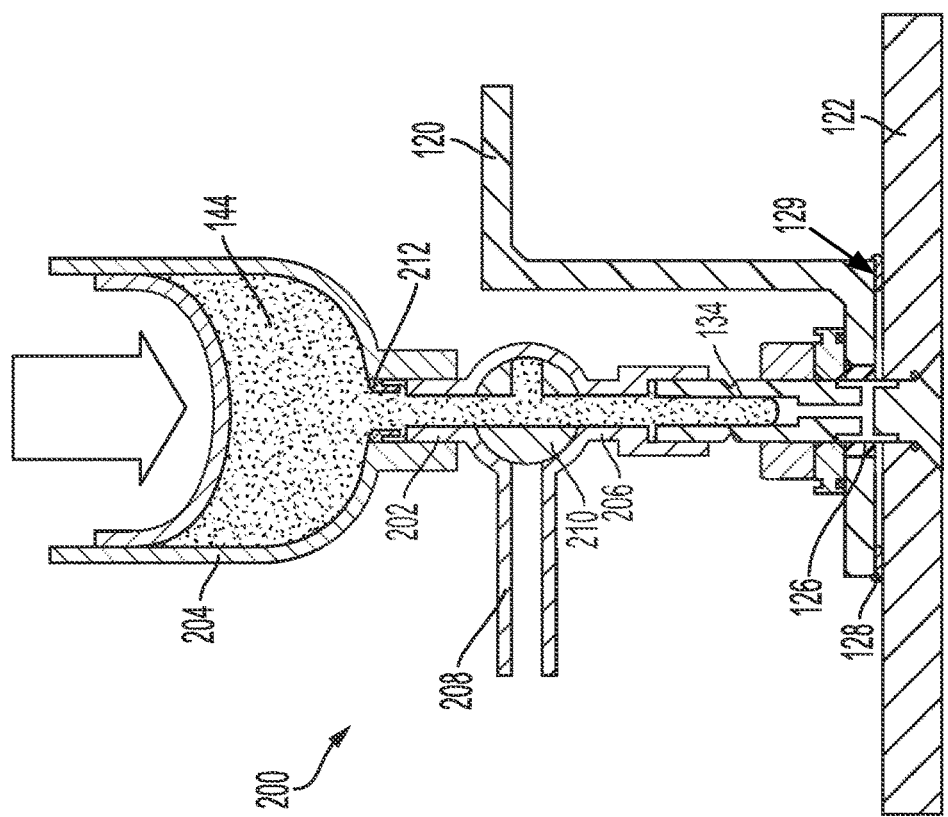
Figure 4B:
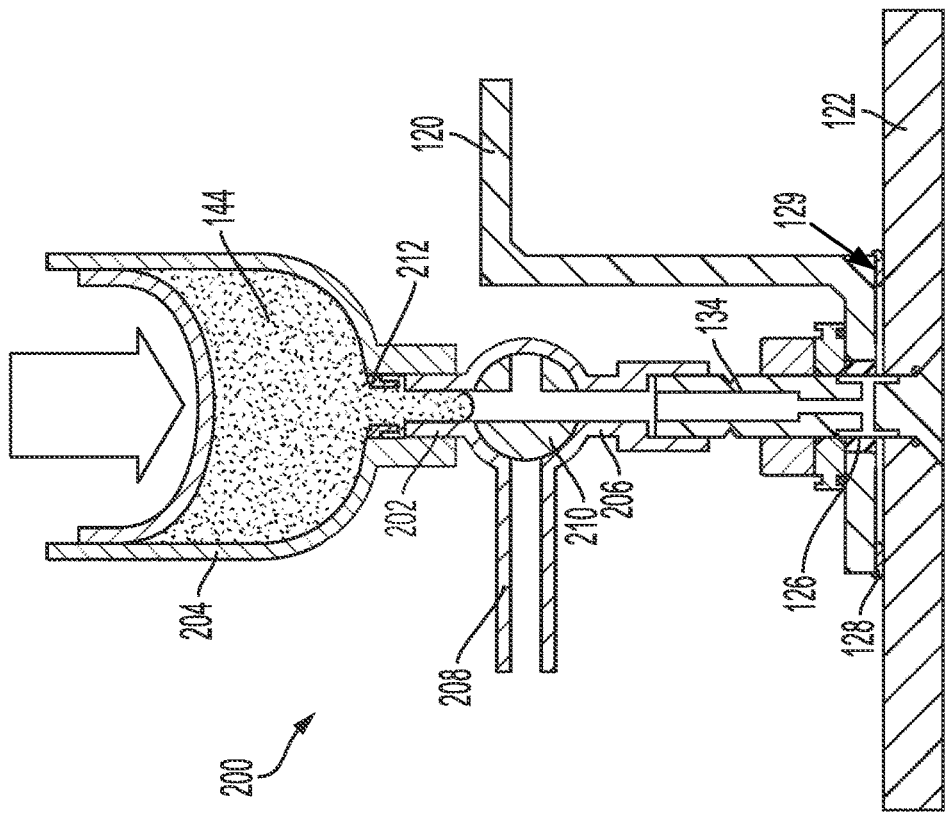

FIG. 4B illustrates a cross-sectional view of a next stage in which the adhesive 144 is forced out of the adhesive reservoir 204, breaking the frangible seal 212, and into the evacuated transfer channel 202. To facilitate injection of the adhesive 144 into the bond cavity, the three-way valve 210 is positioned to establish fluid communication between the evacuated transfer channel 202 and the evacuated injection channel 206, as shown. An arrow is shown in FIGS. 4B-4E to illustrate pressure placed on the adhesive reservoir 204, thus forcing the adhesive 144 out of the adhesive reservoir 204.

FIG. 4C illustrates a cross-sectional view of a next stage in which the adhesive 144 is forced through the evacuated injection channel 206 and through the fastener 134.

Figure 4E:
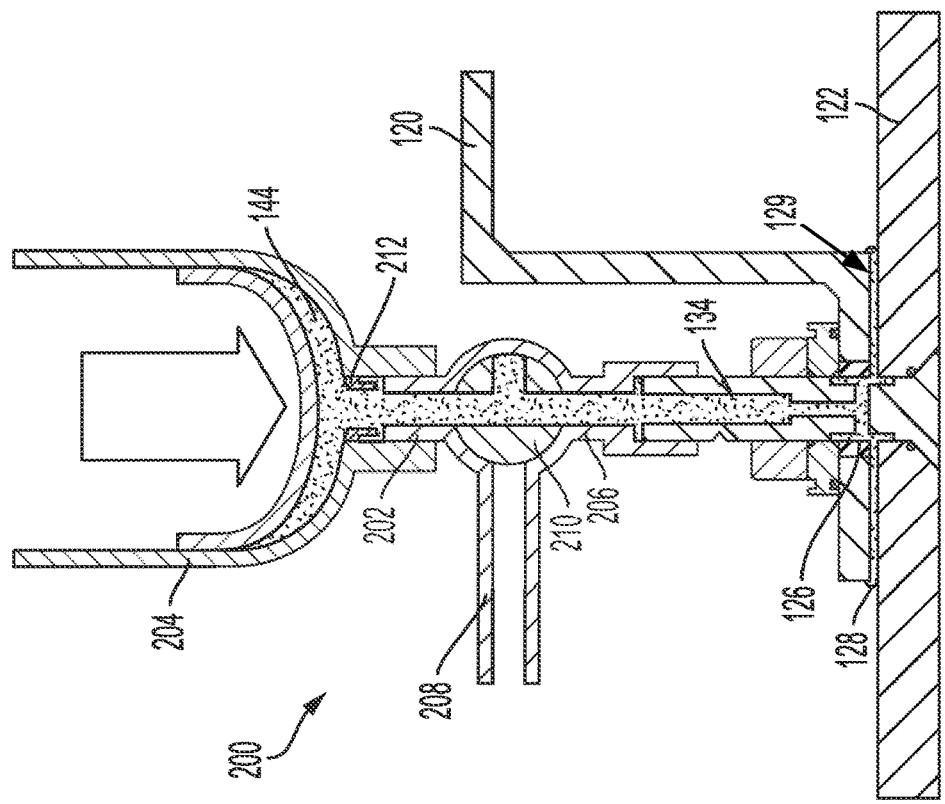
Figure 4D:
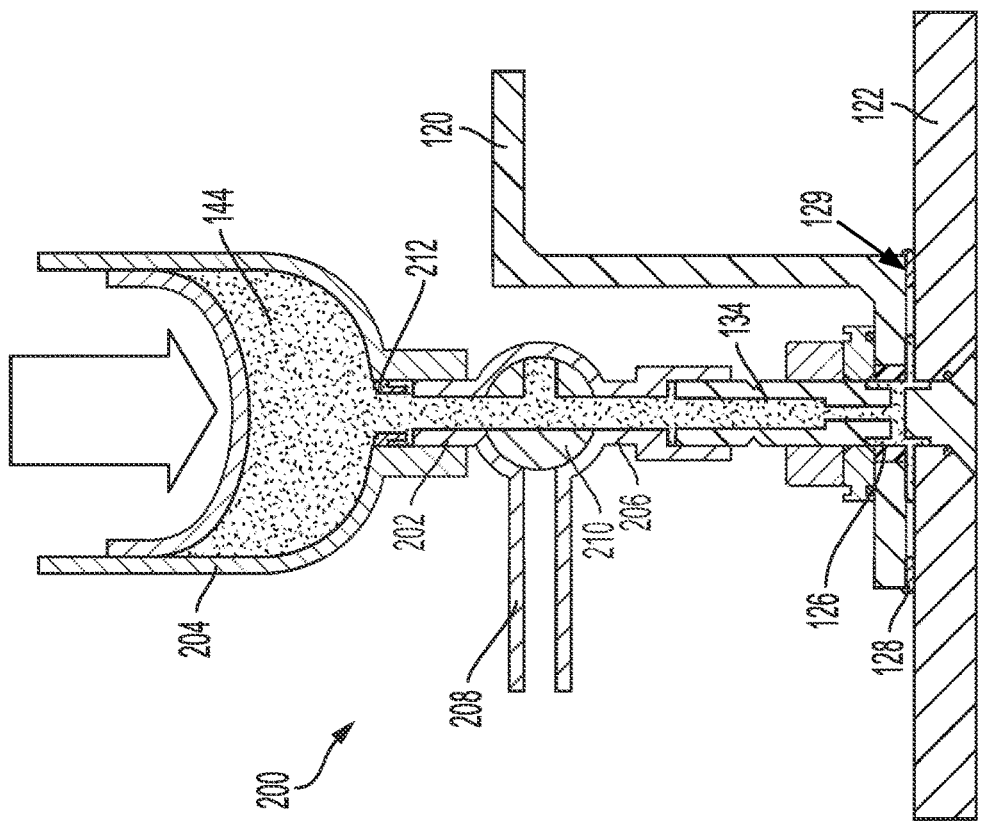

FIG. 4D illustrates a cross-sectional view of a next stage in which the adhesive 144 is forced through the evacuated injection channel 206 and through the fastener 134.

FIG. 4E illustrates a cross-sectional view of a next stage in which the adhesive 144 fills the evacuated bond cavity. The adhesive 144 has no air and when injected into the evacuated bond cavity, no voids or trapped air bubbles will be present. The resulting bondline is a voidfree bondline, for example.

In some examples, such as those illustrated in FIGS. 4A-4E, the bond cavity between the first structure 120 and the second structure 122 has a perimeter defined by an adhesive (e.g., the same type of adhesive as the adhesive 128, or a different type). In other examples, such as that illustrated in FIG. 5, the perimeter of the bond cavity is defined by a sealant bead that is placed around the perimeter of the first structure 120 and/or the second structure 122 to seal the bond cavity and serve as an edge maskant. As a more particular example, the first structure 120 can be fastened to the second structure 122, and then an injection nozzle or other applicator can be used to place the sealant bead around the perimeter of the first structure 120 to seal the bond cavity. Other examples are possible as well.

Figure 5:
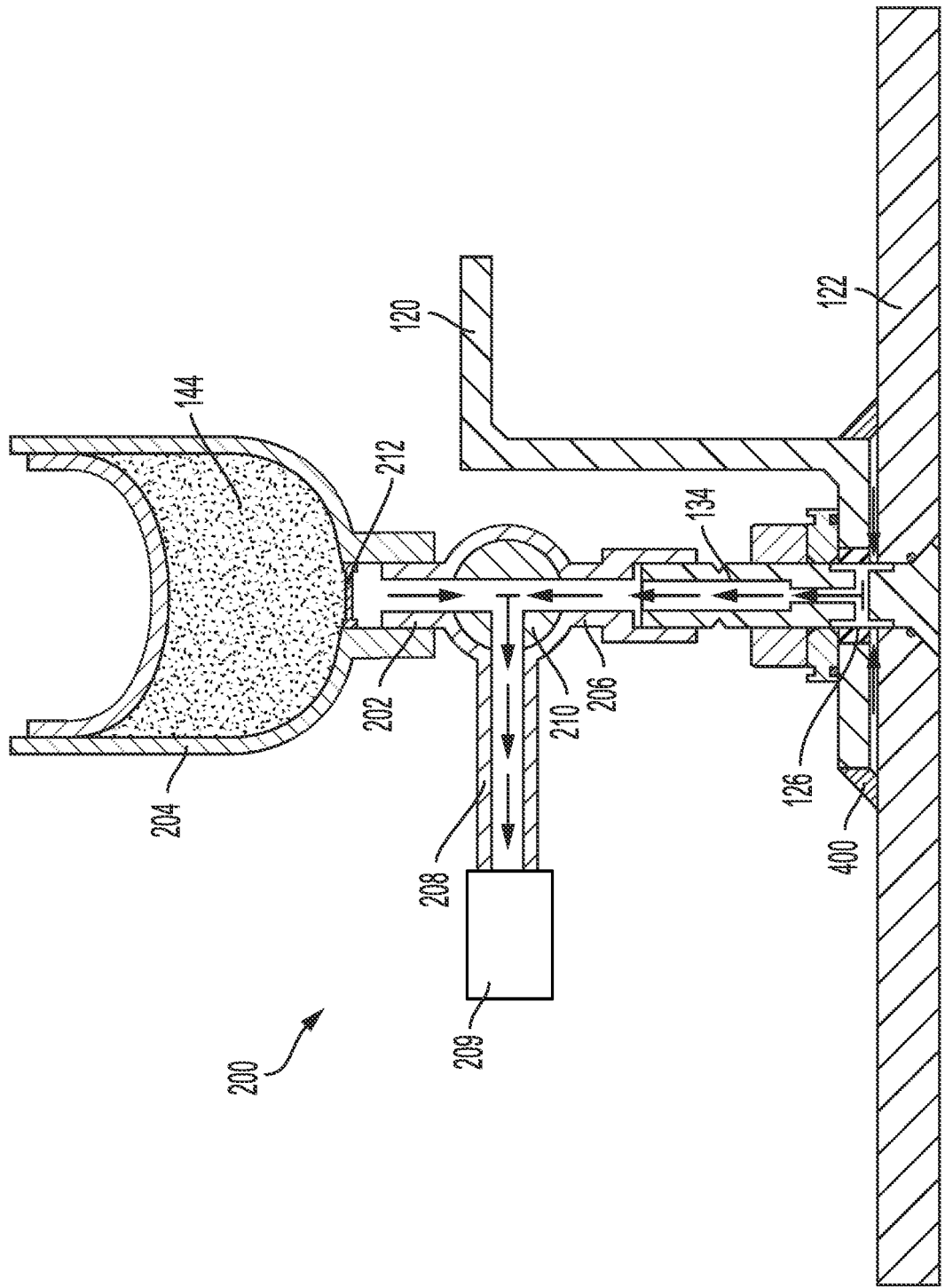
FIG. 5 illustrates an example stage of a process in which an adhesive is injected in a bond cavity between structural components, where a sealant bead defines a perimeter of the bond cavity, according to an example implementation.

FIG. 5 illustrates a representative example stage in a process similar to the process described above, where the bond cavity is evacuated and the adhesive 144 is thereafter forced into the bond cavity, specifically in a scenario where a sealant bead 400 defines a perimeter of the bond cavity. More particularly, FIG. 5 illustrates a stage in which the bond cavity is evacuated at substantially the same time as the injection channel 206 and the transfer channel 202, as shown by the arrows and the positioning of the three-way valve 210. To facilitate this, as further shown, the adhesive injection apparatus 200 is attached to a hole (e.g., the second hole 126) formed in the first structure 120 via the fastener 134. Alternatively, in some scenarios, a fastener might not be present and the adhesive injection apparatus 200 is attached to the hole in another manner. After the injection channel 206, the transfer channel 202, and the bond cavity are evacuated, the adhesive 144 can be forced out of the adhesive reservoir 204, through the evacuated transfer channel 202 and evacuated injection channel 206, and into the bond cavity to fill up the bond cavity defined by the sealant bead 400 perimeter (e.g., in a manner similar to that shown in FIGS. 4B-4E). It should be understood that, in some embodiments, the hole that is used for injecting the adhesive 144 can be a single hole, such that no other holes are present in the first structure 120. For instance, in an embodiment where the second hole 126 is used to inject adhesive 144, the first hole 124 might not be present.

Figure 6:
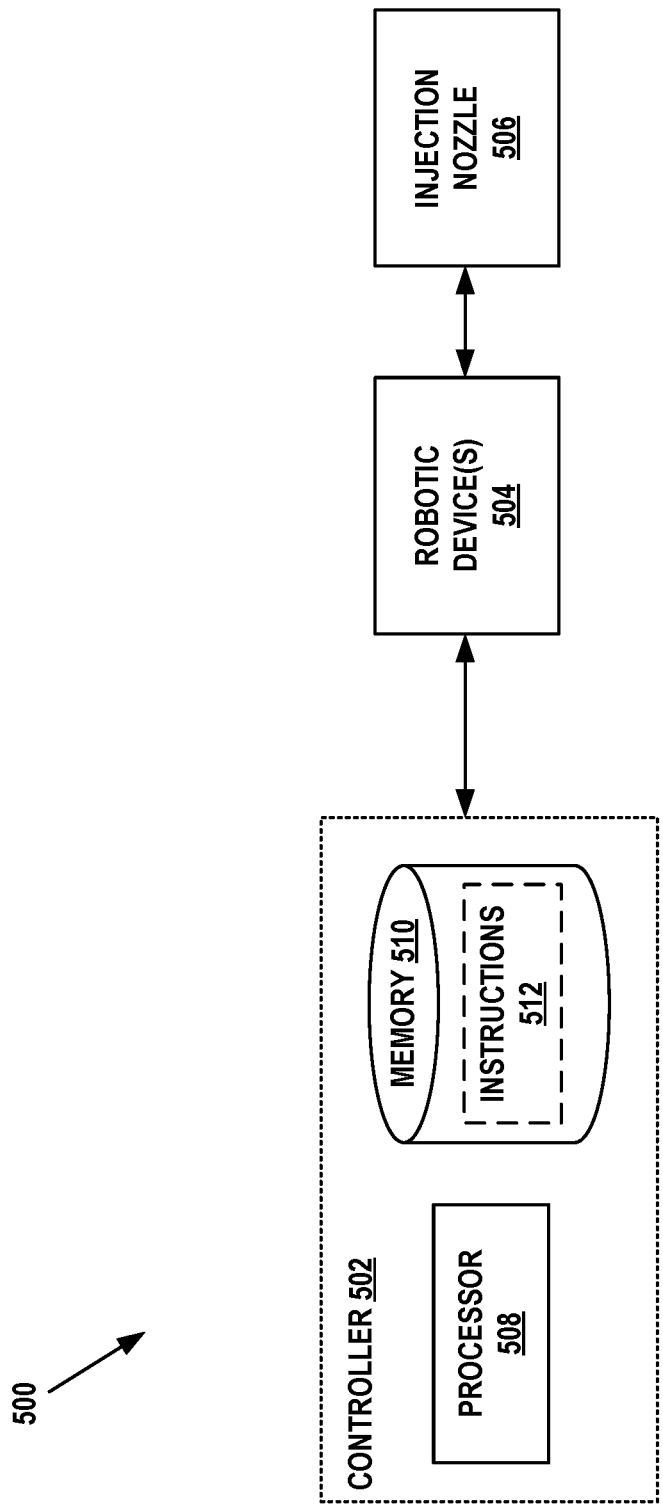
FIG. 6 illustrates an example of a system for performing at least one of the stages described herein, according to an example implementation.

FIG. 6 illustrates an example of a system 500 for performing at least one of the stages described above, according to an example implementation. Within examples, the system 100 for forming a bonded wing 102 of an aircraft 104 illustrated in FIG. 1a includes system 500. The system 500 includes a controller 502 that is in electronic communication (e.g., wired or wireless communication) with one or more robotic devices 504 (e.g., a robotic arm) and an injection nozzle 506. As such, the controller 502 can transmit instructions to control the robotic device 504 and/or the injection nozzle 506.

In embodiments where the one or more robotic devices 504 includes a single robotic device, the single robotic device can be used to apply the adhesive 128 and merge the first structure 120 and the second structure 122, for example. In embodiments where the one or more robotic devices 504 include two or more robotic devices, one robotic device can be used to perform one or more tasks (e.g., applying the adhesive 128) and another robotic device can be used to perform one or more other tasks (e.g., merging the structures), for example. Other examples are possible as well.

The controller 502 can take the form of a client device (e.g., a computing device that is actively operated by a user, such as a desktop computer or smartphone), a server, cloud computing device, or some other type of computational platform. As shown, the controller 502 includes a processor 508 and a memory 510. The processor 508 can be a general-purpose processor or special purpose processor (e.g., a digital signal processor, application specific integrated circuit, etc.). The processor 508 is configured to execute instructions 512 (e.g., computer-readable program instructions including computer executable code) that are stored in the memory 510 and are executable to provide various operations described herein. In an example, the processor 508 can execute instructions 512 that control the robotic device 504 to place, via the injection nozzle 506, the adhesive 128 around the perimeter 129 of the first structure 120. Other examples of providing a bead of the adhesive 128 around the perimeter 129 of the first structure 120 are possible as well. For example, the adhesive 128 can be placed manually with some assistance from a tool (e.g., a hand-maneuvered edge-following tool) or manually without such assistance (e.g., a mechanic placing the adhesive 128 using a squeeze gun).

Within examples, the controller 502 is configured to (i) control the one or more robotic devices 504 to position the first structure 120 relative to the second structure 122 such that the adhesive 128 is disposed between the first structure 120 and the second structure 122, (ii) control the one or more robotic devices 504 to merge the first structure 120 and the second structure 122 until the first structure 120 and the second structure 122 are separated by a desired gap for bonding, and (iii) control the one or more robotic devices 504 to heat the perimeter 129 to at least partially cure the adhesive 128 to form the leak-proof bond cavity perimeter between the first structure 120 and the second structure 122.

Within examples, the controller 502 is configured to control the one or more robotic devices 504 to merge the first structure 120 and the second structure 122 until the first structure 120 and the second structure 122 are separated by the desired gap for bonding by controlling the one or more robotic devices 504 to merge the first structure 120 and the second structure 122 until the first structure 120 and the second structure 122 are separated by the thickness of the plurality of micro-beads 130 that defines the desired gap for bonding.

Within examples, the controller 502 is configured to control the one or more robotic devices 504 to place the adhesive 128 around the perimeter 129 of the first structure 120 to be joined to the second structure 122 by controlling the one or more robotic devices 504 to place, around the perimeter 129 of the first structure 120 to be joined to the second structure 122, a bead of the adhesive 128 having a shape selected from the group consisting of: a triangle, a semi-circle, a trapezoid, a rectangle, and an amorphous shape.

The memory 510 can take the form of one or more computer-readable storage media that can be read or accessed by the processor 508. The computer-readable storage media can include volatile and/or non-volatile storage components, such as optical, magnetic, organic or other memory or disc storage, which can be integrated in whole or in part with the processor 508. The memory 510 is considered non-transitory computer readable media. In some examples, the memory 510 can be implemented using a single physical device (e.g., one optical, magnetic, organic or other memory or disc storage unit), while in other examples, the memory 510 can be implemented using two or more physical devices.

Figure 7:
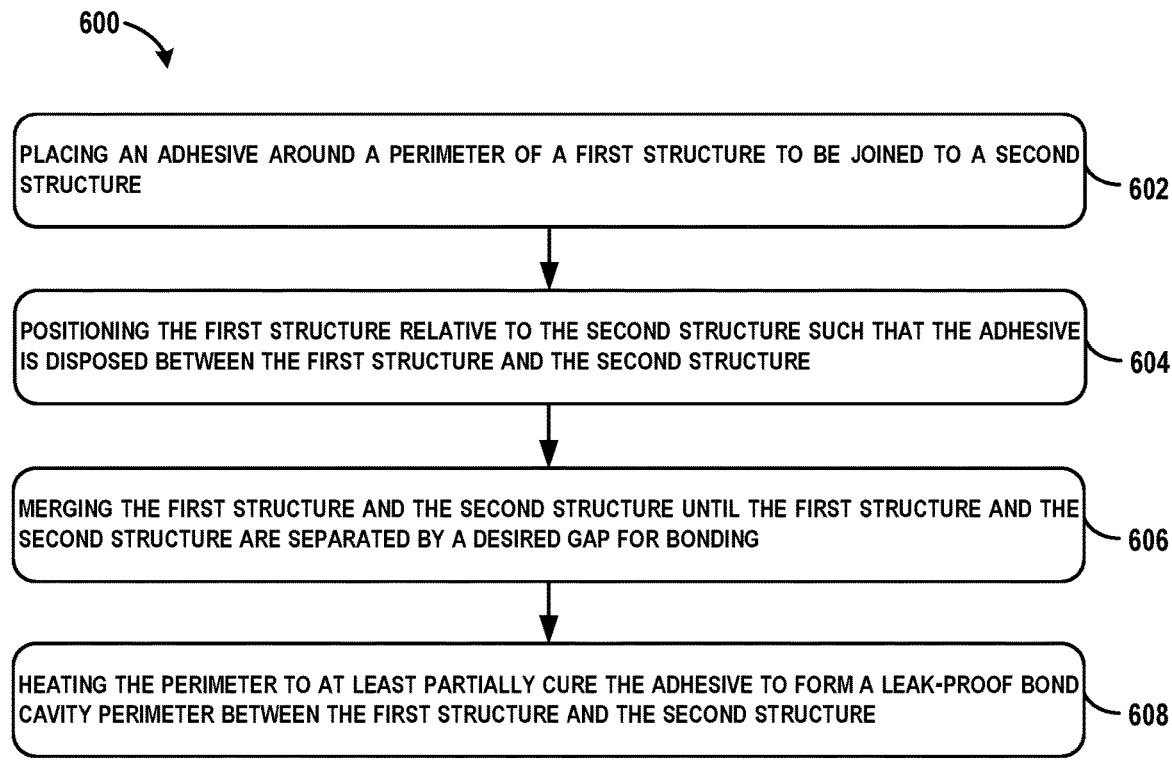
FIG. 7 shows a flowchart of an example method for sealing a bond cavity, according to an example implementation.

FIG. 7 shows a flowchart of an example of a method 600 of sealing a bond cavity. Method 600 shown in FIG. 7 presents an example of a method that could be used with the system 100 and the system 500 shown in FIGS. 1-2 and 5, a combination thereof, or with components thereof. Further, the functions described with respect to FIG. 7 may be supplemented by, replaced by, or combined with functions and phases described above with respect to FIGS. 3A-3G and FIGS. 4A-4E, for example. Further, devices or systems may be used or configured to perform logical functions presented in FIG. 7.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 600 includes one or more operations, functions, or actions as illustrated by one or more of blocks 602-608. Further, blocks of FIGS. 8-21 may be performed in accordance with one or more of block 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Within examples, one or more blocks of the method 600 may be represented in program code or circuitry used for controlling robotic mechanisms for joining the first structure and the second structure (e.g., as for assembling a bonded structure and/or a wing including a plurality of bonded structures). While method 600 and variations thereof may be executed automatically using, for example, one or more robotic armatures controlled by program code operating in accordance with the method 600, some tasks may be performed manually. Thus, within examples, certain functionality described with respect to the method 600 may be performed automatically while other portions can be performed manually. Alternatively, all blocks of the method 600 may be performed automatically or all blocks of the method 600 may be performed manually.

At block 602, the method 600 includes placing an adhesive 128 around a perimeter 129 of a first structure 120 to be joined to a second structure 122.

At block 604, the method 600 includes positioning the first structure 120 relative to the second structure 122 such that the adhesive 128 is disposed between the first structure 120 and the second structure 122.

At block 606, the method 600 includes merging the first structure 120 and the second structure 122 until the first structure 120 and the second structure 122 are separated by a desired gap for bonding.

At block 608, the method 600 includes heating the perimeter 129 to at least partially cure the adhesive 128 to form a leak-proof bond cavity perimeter between the first structure 120 and the second structure 122.

Figure 8:
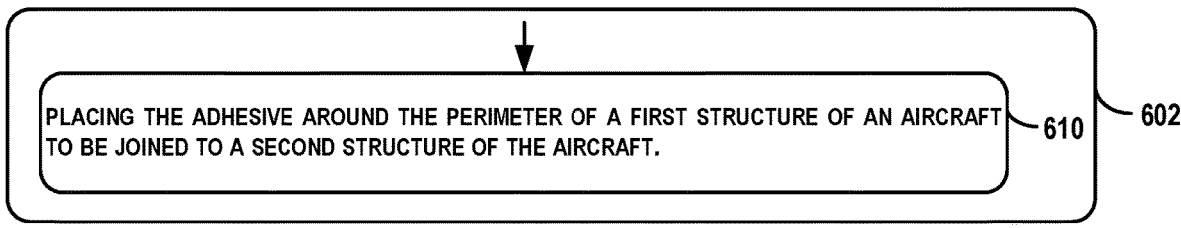
FIG. 8 shows a flowchart of an example method for performing the placing function of the method of FIG. 7, according to an example implementation.

FIG. 8 shows a flowchart of an example method for performing the placing as shown in block 602. At block 610, functions include placing the adhesive 128 around the perimeter 129 of a first structure 120 of an aircraft 104 to be joined to a second structure 122 of the aircraft 104.

Figure 9:
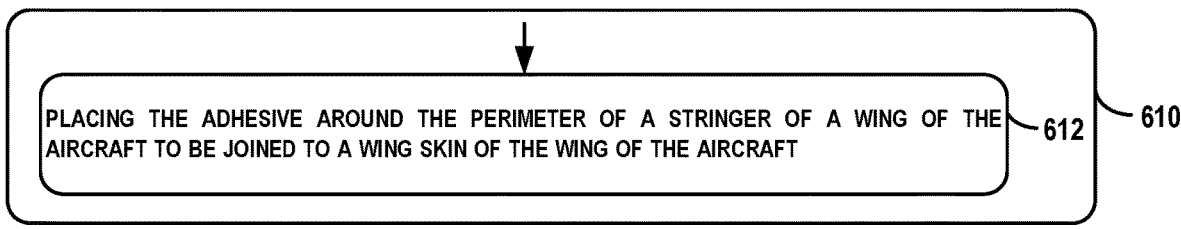
FIG. 9 shows a flowchart of an example method for performing the placing function of the method of FIG. 8, according to an example implementation.

FIG. 9 shows a flowchart of an example method for performing the placing as shown in block 610. At block 612, functions include placing the adhesive 128 around the perimeter 129 of a stringer of a wing 102 of the aircraft 104 to be joined to a wing skin 116 of the wing 102 of the aircraft 104. In an example, the stringer is one of the longerons 112 shown in FIG. 1A.

FIG. 10 shows a flowchart of an example method for performing the placing as shown in block 602. At block 614, functions include placing, around the perimeter 129 of the first structure 120 to be joined to the second structure 122, a bead of the adhesive 128 having a shape selected from the group consisting of: a triangle, a semi-circle, a trapezoid, a rectangle, and an amorphous shape.

FIG. 11 shows a flowchart of an example method for performing the placing as shown in block 602. At block 616, functions include placing the adhesive 128 around the perimeter 129 of the first structure 120 to be joined to the second structure 122 through an injection nozzle 506 that is controlled in an at least partially autonomous manner.

FIG. 12 shows a flowchart of an example method for performing the merging as shown in block 606. At block 618, functions include merging the first structure 120 and the second structure 122 until the first structure 120 and the second structure 122 are separated by the thickness of the plurality of micro-beads 130 that defines the desired gap for bonding.

FIG. 13 shows a flowchart of an example method for performing the positioning as shown in block 604 and the merging as shown in block 606. At block 620, functions include aligning the first structure 120 relative to the second structure 122 with one or more fasteners 132, 134. At block 622, functions include merging the first structure 120 and the second structure 122 by tightening a clamping tool securing the first structure 120 and the second structure 122.

Figure 14:
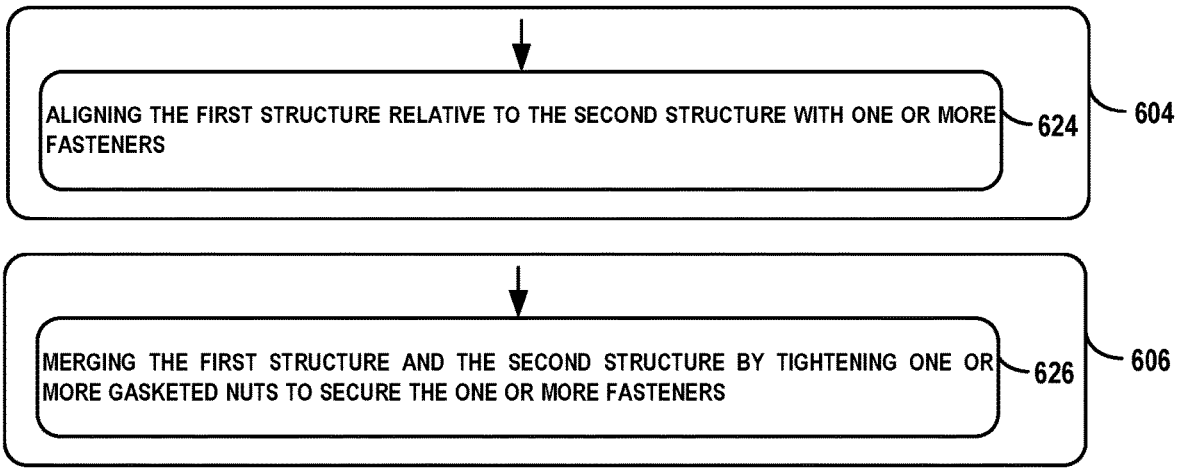
FIG. 14 shows a flowchart of an example method for performing the positioning and merging functions of the method of FIG. 7, according to an example implementation.

FIG. 14 shows a flowchart of an example method for performing the positioning as shown in block 604 and the merging as shown in block 606. At block 624, functions include aligning the first structure 120 relative to the second structure 122 with one or more fasteners 132, 134. At block 626, functions include merging the first structure 120 and the second structure 122 by tightening one or more gasketed nuts 136, 138 to secure the one or more fasteners 132, 134.

Figure 15:
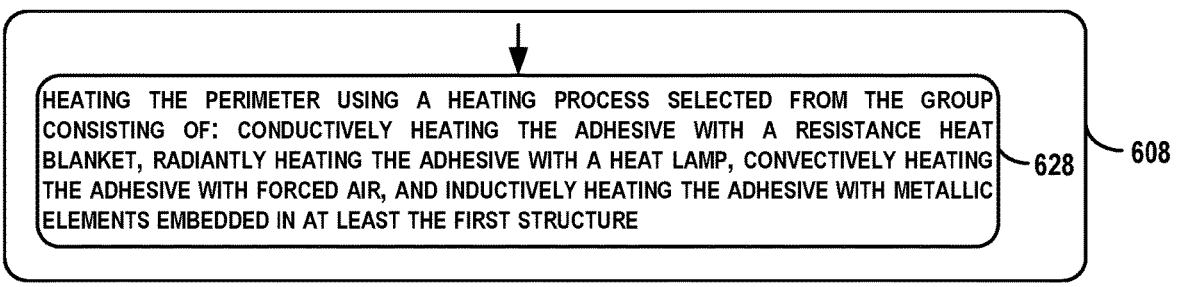
FIG. 15 shows a flowchart of an example method for performing the heating function of the method of FIG. 7, according to an example implementation.

FIG. 15 shows a flowchart of an example method for performing the heating as shown in block 608. At block 628, functions include heating the perimeter 129 using a heating process selected from the group consisting of: conductively heating the adhesive 128 with a resistance heat blanket, radiantly heating the adhesive 128 with a heat lamp, convectively heating the adhesive 128 with forced air, and inductively heating the adhesive 128 with metallic elements embedded in at least the first structure 120.

Figure 16:
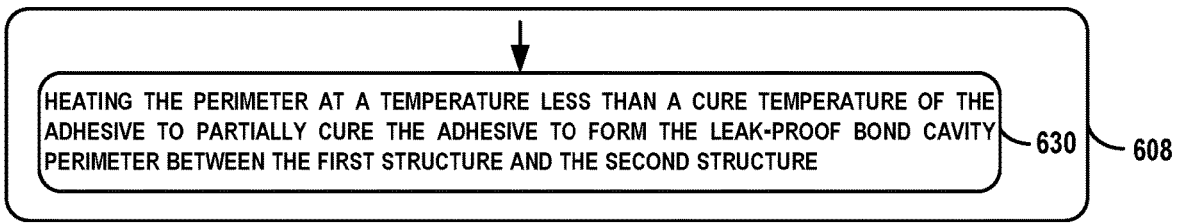
FIG. 16 shows a flowchart of an example method for performing the heating function of the method of FIG. 7, according to an example implementation.

FIG. 16 shows a flowchart of an example method for performing the heating as shown in block 608. At block 630, functions include heating the perimeter 129 at a temperature less than a cure temperature of the adhesive 128 to partially cure the adhesive 128 to form the leak-proof bond cavity perimeter between the first structure 120 and the second structure 122.

Figure 17:
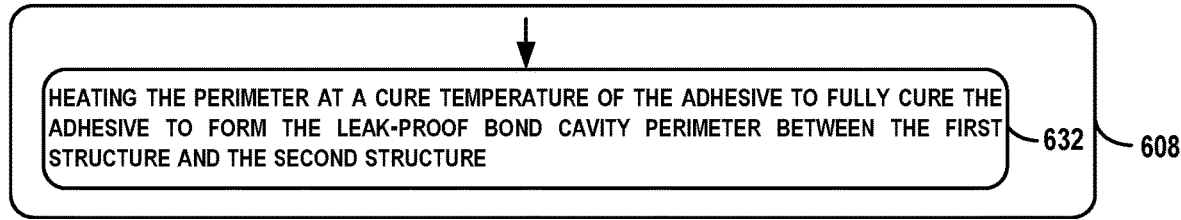
FIG. 17 shows a flowchart of an example method for performing the heating function of the method of FIG. 7, according to an example implementation.

FIG. 17 shows a flowchart of an example method for performing the heating as shown in block 608. At block 632, functions include heating the perimeter 129 at a cure temperature of the adhesive 128 to fully cure the adhesive 128 to form the leak-proof bond cavity perimeter between the first structure 120 and the second structure 122.

Figure 18:
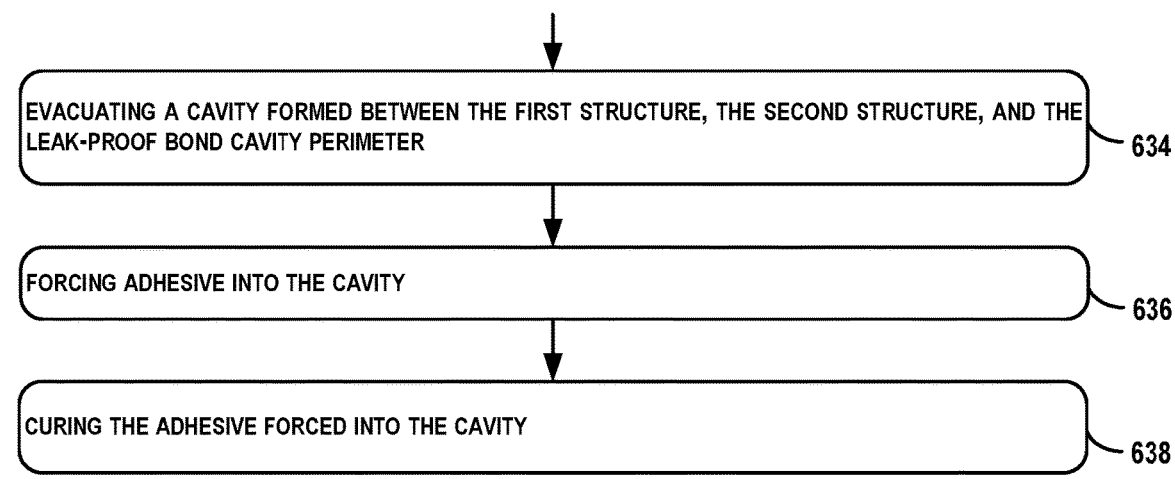
FIG. 18 shows a flowchart of an example method for use with the method of FIG. 7, according to an example implementation.

FIG. 18 shows a flowchart of an example method for use with the method 600. At block 634, functions include evacuating a cavity formed between the first structure 120, the second structure 122, and the leak-proof bond cavity perimeter. At block 636, functions include forcing adhesive 144 into the cavity. At block 638, functions include curing the adhesive 144 forced into the cavity.

Figure 19:
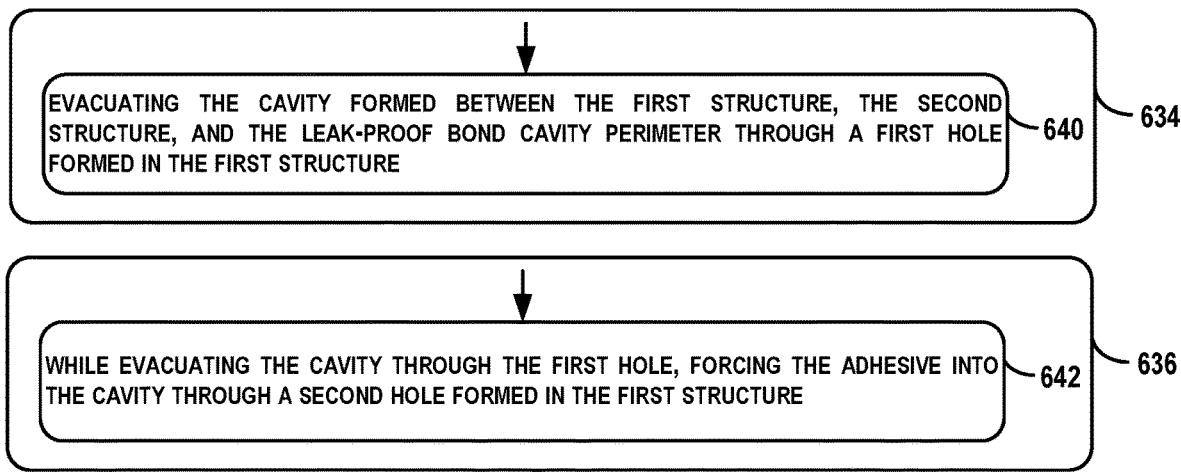
FIG. 19 shows a flowchart of an example method for performing the evacuating and forcing functions of the method of FIG. 18, according to an example implementation.

FIG. 19 shows a flowchart of an example method for performing the evacuating as shown in block 634 and the forcing as shown in block 636. At block 640, functions include evacuating the cavity formed between the first structure 120, the second structure 122, and the leak-proof bond cavity perimeter through a first hole 124 formed in the first structure 120. At block 642, functions include while evacuating the cavity through the first hole 124, forcing the adhesive 144 into the cavity through a second hole 126 formed in the first structure 120.

Figure 20:
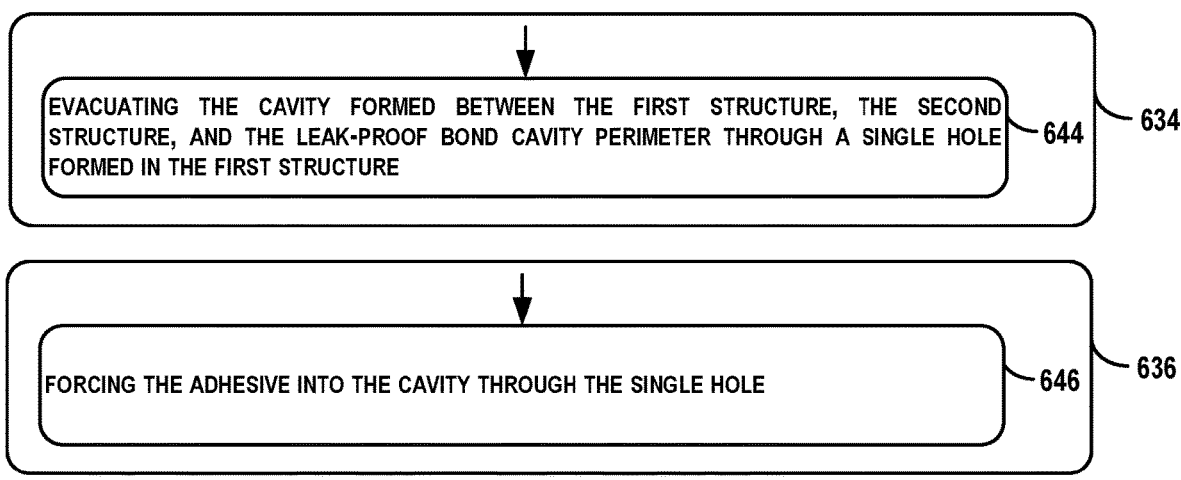
FIG. 20 shows a flowchart of an example method for performing the evacuating and forcing functions of the method of FIG. 18, according to an example implementation.

FIG. 20 shows a flowchart of an example method for performing the evacuating as shown in block 634 and the forcing as shown in block 636. At block 644, functions include evacuating the cavity formed between the first structure 120, the second structure 122, and the leak-proof bond cavity perimeter through a single hole formed in the first structure 120. At block 646, functions include forcing the adhesive 144 into the cavity through the single hole. As an example, the single hole can be the second hole 126, as described above.

Figure 21:
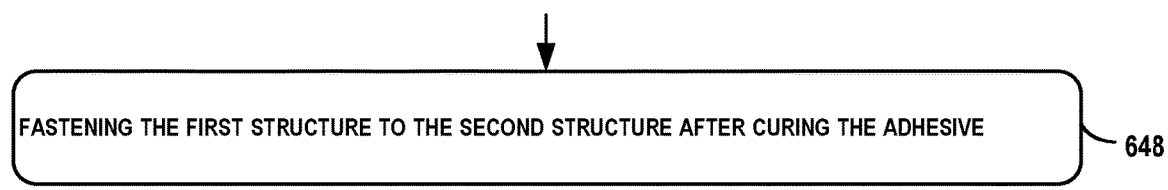
FIG. 21 shows a flowchart of an example method for use with the method of FIG. 18, according to an example implementation.

FIG. 21 shows a flowchart of an example method for use with the method 600, particularly with the functions shown in blocks 634-638. At block 648, functions include fastening the first structure 120 to the second structure 122 after curing the adhesive 144.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of sealing a bond cavity, the method comprising:
   placing, by one or more robotic devices using an injection nozzle, an adhesive around a perimeter of a first structure to be joined to a second structure, wherein the first structure is a stringer of a wing of an aircraft and the second structure is a wing skin;
   positioning, by the one or more robotic devices, the first structure relative to the second structure such that the adhesive is disposed between the first structure and the second structure;
   merging, by the one or more robotic devices, the first structure and the second structure until the first structure and the second structure are separated by a desired gap for bonding;
   heating the perimeter to at least partially cure the adhesive to form a leak-proof bond cavity perimeter between the first structure and the second structure;
   performing a set of tests to check for leaks from the leak-proof bond cavity perimeter between the first structure and the second structure, wherein performing the set of tests to check for leaks involves at least a first test comprising injecting a gas into the leak-proof bond cavity to detect for leaks and a second test to check for leaks that differs from the first test;
   based on the set of tests indicating that the leak-proof bond cavity perimeter does not leak, evacuating a cavity formed between the first structure, the second structure, and the leak-proof bond cavity perimeter;
   puncturing a small hole proximate the cavity using a hypodermic needle;
   forcing a de-aerated adhesive into the cavity via the hypodermic needle, wherein the de-aerated adhesive is an adhesive paste with bubbles evacuated; and
   curing the adhesive forced into the cavity.

2. The method of claim 1, wherein placing the adhesive around the perimeter of the first structure to be joined to the second structure comprises placing, around the perimeter of the first structure to be joined to the second structure, a bead of the adhesive having a shape selected from the group consisting of: a triangle, a semi-circle, a trapezoid, and a rectangle.

3. The method of claim 1, wherein placing the adhesive around the perimeter of the first structure to be joined to the second structure comprises placing the adhesive around the perimeter of the first structure to be joined to the second structure through an injection nozzle that is controlled in an at least partially autonomous manner.

4. The method of claim 1, wherein the adhesive comprises a plurality of micro-beads having a thickness that defines the desired gap for bonding, and
   wherein merging the first structure and the second structure until the first structure and the second structure are separated by the desired gap for bonding comprises merging the first structure and the second structure until the first structure and the second structure are separated by the thickness of the plurality of micro-beads that defines the desired gap for bonding.

5. The method of claim 1, wherein positioning the first structure relative to the second structure such that the adhesive is disposed between the first structure and the second structure comprises aligning the first structure relative to the second structure with one or more fasteners, and
wherein merging the first structure and the second structure until the first structure and the second structure are separated by the desired gap for bonding comprises merging the first structure and the second structure by tightening a clamping tool securing the first structure and the second structure.

6. The method of claim 1, wherein positioning the first structure relative to the second structure such that the adhesive is disposed between the first structure and the second structure comprises aligning the first structure relative to the second structure with one or more fasteners, and
wherein merging the first structure and the second structure until the first structure and the second structure are separated by the desired gap for bonding comprises merging the first structure and the second structure by tightening one or more gasketed nuts to secure the one or more fasteners.

7. The method of claim 1, wherein heating the perimeter to at least partially cure the adhesive to form the leak-proof bond cavity perimeter between the first structure and the second structure comprises heating the perimeter using a heating process selected from the group consisting of: conductively heating the adhesive with a resistance heat blanket, radiantly heating the adhesive with a heat lamp, convectively heating the adhesive with forced air, and inductively heating the adhesive with metallic elements embedded in at least the first structure.

8. The method of claim 1, wherein heating the perimeter to at least partially cure the adhesive to form the leak-proof bond cavity perimeter between the first structure and the second structure comprises heating the perimeter at a given temperature to partially cure the adhesive to form the leak-proof bond cavity perimeter between the first structure and the second structure.

9. The method of claim 1, wherein heating the perimeter to at least partially cure the adhesive to form the leak-proof bond cavity perimeter between the first structure and the second structure comprises heating the perimeter at a cure temperature of the adhesive to fully cure the adhesive to form the leak-proof bond cavity perimeter between the first structure and the second structure.

10. The method of claim 1, wherein evacuating the cavity formed between the first structure, the second structure, and the leak-proof bond cavity perimeter comprises evacuating the cavity formed between the first structure, the second structure, and the leak-proof bond cavity perimeter through a first hole formed in the first structure, and
wherein forcing the adhesive into the cavity comprises while evacuating the cavity through the first hole, forcing the adhesive into the cavity through a second hole formed in the first structure.

11. The method of claim 1, wherein evacuating the cavity formed between the first structure, the second structure, and the leak-proof bond cavity perimeter comprises evacuating the cavity formed between the first structure, the second structure, and the leak-proof bond cavity perimeter through a single hole formed in the first structure, and
wherein forcing the adhesive into the cavity comprises forcing the adhesive into the cavity through the single hole.

12. The method of claim 1, further comprising:
fastening the first structure to the second structure after curing the adhesive.

13. The method of claim 1, wherein heating the perimeter comprises:
applying heat via a heat lamp to the perimeter to at least partially cure the adhesive to form the leak-proof bond cavity.

14. The method of claim 1, wherein the one or more robotic devices includes a plurality of robotic devices arranged on an assembly line.

15. The method of claim 1, wherein placing the adhesive around the perimeter of the first structure comprises:
triggering a robotic device to autonomously adjust a position of the injection nozzle to place the adhesive around the perimeter of the first structure, wherein the robotic device uses a robotic arm to change position of the injection nozzle.

16. The method of claim 1, wherein evacuating the cavity formed between the first structure, the second structure, and the leak-proof bond cavity perimeter comprises:
evacuating the cavity using a vacuum source.

17. The method of claim 1, wherein performing the set of tests to check for leaks comprises:
injecting helium into the leak-proof bond cavity to detect for leaks.

18. The method of claim 1, further comprising:
drilling one or more additional holes into the first structure, the second structure, and the cured adhesive; and
applying one or more additional fasteners to the one or more additional holes to fasten the first structure and the second structure.

19. The method of claim 1, wherein heating the perimeter to at least partially cure the adhesive to form the leak-proof bond cavity perimeter between the first structure and the second structure comprises:
inductively heating the adhesive with metallic elements embedded in at least the first structure.

20. The method of claim 1, further comprising:
based on performing the set of tests to check for leaks, detecting a leak in the leak-proof bond cavity perimeter; and
touching up the detected leak using a dab of sealant.

* * * * *